(12) United States Patent
Shmilovich et al.

(10) Patent No.: US 7,661,629 B2
(45) Date of Patent: Feb. 16, 2010

(54) SYSTEMS AND METHODS FOR DESTABILIZING AN AIRFOIL VORTEX

(75) Inventors: Arvin Shmilovich, Huntington Beach, CA (US); Yoram Yadlin, Irvine, CA (US); Roger W. Clark, Huntington Beach, CA (US); Donald H. Leopold, Rancho Santa Margarita, CA (US)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 11/370,099

(22) Filed: Mar. 7, 2006

(65) Prior Publication Data

US 2009/0173835 A1    Jul. 9, 2009

Related U.S. Application Data

(63) Continuation-in-part of application No. 10/784,067, filed on Feb. 20, 2004, now Pat. No. 7,100,875.

(51) Int. Cl.
*B64C 23/00* (2006.01)
*B64C 21/04* (2006.01)

(52) U.S. Cl. .................................... 244/199.2; 244/207

(58) Field of Classification Search .............. 244/35 A, 244/130, 199.1, 199.2, 199.3, 199.4, 207, 244/136
See application file for complete search history.

(56) References Cited

U.S. PATENT DOCUMENTS

| | | |
|---|---|---|
| 2,477,461 A | 7/1949 | Lee |
| 2,650,781 A | 9/1953 | Taylor |
| 3,012,740 A | 4/1958 | Wagner |
| 3,090,584 A * | 5/1963 | Kuchemann et al. ..... 244/199.1 |

(Continued)

FOREIGN PATENT DOCUMENTS

DE    1756541    4/1970

(Continued)

OTHER PUBLICATIONS

Lewellen, D.C. et al., "Large-Eddy Simulations and Lidar Measurements of Vortex-Pair Breakup in Aircraft Wakes," Aug. 8, 1998, AIAA Journal, vol. 36 No. 8, pp. 1439-1445.

(Continued)

*Primary Examiner*—Rob Swiatek
(74) *Attorney, Agent, or Firm*—Perkins Coie LLP

(57) ABSTRACT

Apparatuses and methods for the controlled trailing wake flows. An apparatus in accordance with one embodiment is directed to an aircraft system that includes an airfoil having first and second oppositely facing flow surfaces and a tip. The system can further include a vortex dissipation device carried by the airfoil, with the vortex dissipation device including a fluid flow nozzle, a valve device, and a controller. The fluid flow nozzle can be coupleable to a source of pressurized fluid and can include an orifice positioned to direct a flow of fluid outwardly from the tip. The valve device can be coupled in fluid communication with the fluid flow nozzle to selectively control the flow passing through the orifice. The controller can be coupled to the valve device to direct the operation of the valve device. Accordingly, the vortex dissipation device can be activated to accelerate the rate at which vortices (e.g., wing tip vortices) dissipate after they are generated.

18 Claims, 21 Drawing Sheets

U.S. PATENT DOCUMENTS

| | | | |
|---|---|---|---|
| 3,480,234 | A | 11/1969 | Cornish |
| 3,596,854 | A | 8/1971 | Haney, Jr. |
| 3,604,661 | A | 9/1971 | Mayer, Jr. |
| 3,692,259 | A | 9/1972 | Yuan |
| 3,761,929 | A | 9/1973 | Wyatt |
| 3,841,587 | A | 10/1974 | Freed |
| 3,845,918 | A | 11/1974 | White, Jr. |
| 3,881,669 | A | 5/1975 | Lessen |
| 3,936,013 | A | 2/1976 | Yuan |
| 3,974,986 | A | 8/1976 | Johnstone |
| 3,984,070 | A | 10/1976 | Patterson, Jr. |
| 3,997,132 | A | 12/1976 | Erwin |
| 4,477,042 | A | 10/1984 | Griswold, II |
| 4,860,976 | A | 8/1989 | McFadden et al. |
| 5,150,859 | A | 9/1992 | Ransick |
| 5,158,251 | A | 10/1992 | Taylor |
| 5,492,289 | A | 2/1996 | Nosenchuck et al. |
| 5,634,613 | A | 6/1997 | McCarthy |
| 5,755,408 | A | 5/1998 | Schmidt et al. |
| 5,758,823 | A | 6/1998 | Glezer et al. |
| 5,806,807 | A | 9/1998 | Haney |
| 5,813,625 | A | 9/1998 | Hassan et al. |
| 5,845,874 | A | 12/1998 | Beasley |
| 5,918,835 | A | 7/1999 | Gerhardt |
| 5,938,404 | A | 8/1999 | Domzalski et al. |
| 5,957,413 | A | 9/1999 | Glezer et al. |
| 5,988,522 | A | 11/1999 | Glezer et al. |
| 6,082,679 | A | 7/2000 | Crouch et al. |
| 6,123,145 | A | 9/2000 | Glezer et al. |
| 6,129,309 | A | 10/2000 | Smith et al. |
| 6,138,955 | A | 10/2000 | Gutmark et al. |
| 6,283,406 | B1 | 9/2001 | Remington et al. |
| 6,378,807 | B1 | 4/2002 | Tomioka |
| 6,394,397 | B1 | 5/2002 | Ngo et al. |
| 6,422,518 | B1 | 7/2002 | Stuff et al. |
| 6,424,408 | B1 | 7/2002 | Ooga et al. |
| 6,425,553 | B1 | 7/2002 | Smith et al. |
| 6,471,477 | B2 | 10/2002 | Hassan et al. |
| 6,513,761 | B2 | 2/2003 | Huenecke |
| 6,554,607 | B1 | 4/2003 | Glezer et al. |
| 6,629,674 | B1 | 10/2003 | Saddoughi et al. |
| 6,668,638 | B2 | 12/2003 | Huang et al. |
| 7,017,862 | B1 | 3/2006 | Fischbach |
| 7,104,143 | B1 | 9/2006 | Powell |
| 7,510,149 | B2 * | 3/2009 | Miller et al. ............... 244/207 |
| 2003/0222795 | A1 | 12/2003 | Holforty et al. |
| 2005/0184196 | A1 | 8/2005 | Shmilovich et al. |
| 2006/0244637 | A1 | 11/2006 | Baranov et al. |
| 2007/0034743 | A1 | 2/2007 | Albers et al. |
| 2007/0034746 | A1 | 2/2007 | Shmilovich et al. |
| 2007/0045476 | A1 | 3/2007 | Shmilovich et al. |
| 2007/0051855 | A1 | 3/2007 | Shmilovich et al. |
| 2008/0035784 | A1 | 2/2008 | Meserole et al. |
| 2008/0035789 | A1 | 2/2008 | Lewis et al. |
| 2008/0042013 | A1 | 2/2008 | Shmilovich et al. |

FOREIGN PATENT DOCUMENTS

| | | |
|---|---|---|
| DE | 10039109 | 2/2002 |
| EP | 0689990 | 1/1996 |

OTHER PUBLICATIONS

Rodenhiser, R., "An Ultrasonic Method for Aircraft Wake Vortex Detection," Aug. 30, 2005, 115 pgs, Worcester Polytechnic Institute.

Sauvage, L., et al., "WB Separations Technology Case, Preparation of Wake Vortex Detection Technology Case, Eurocontrol EEC TRSC52/2004, Public Summary Report," 29 pgs, Mar. 2005, Leosphere, Paris, France.

Socrates Wake Vortex Tection and Tracking: A Technical Status Report, Nov. 22, 2004, 29 pgs, Flight Safety Technology, Lockheed Martin.

Tank, W., "Airplane wake detection iwth a VHF cw bistatic radar,"Jan. 1997, 13 pgs, AIAA Meeting Papers, American Institute of Aeronautics and Astronautics, Inc.

Wall, Robert, "Airbus Cries Foul in A380 Wake Vortex Debate," 2 pgs, http://www.aviationnow.com/search/AvnowSearchResult.do?reference, accessed Jan. 10, 2006.

PCT International Search Report and Written Opinion for PCT/US07/05253; Applicant: The Boeing Company; mailed May 28, 2008, 16 pages.

Choroba et al. "The Concept of Integrated Air Traffic Control Wake Vortex Safety and Capacity System," IEEE Oct. 2003, vol. 1, pp. 684-688.

* cited by examiner

BEFORE ACTIVATION

AFTER ACTIVATION

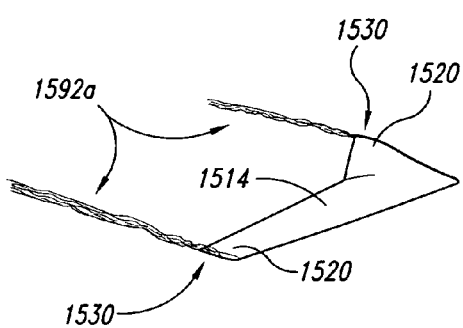
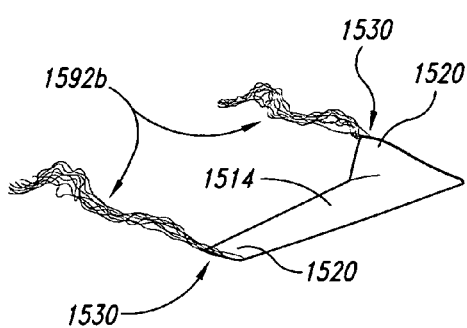
Fig. 16A Fig. 16B
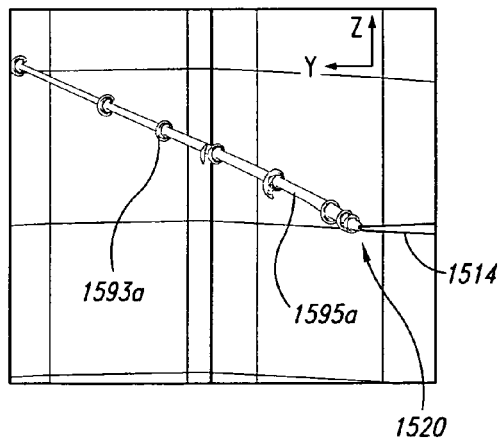
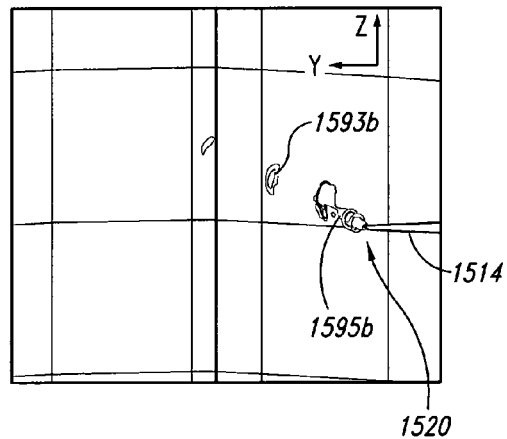
Fig. 17A Fig. 17B

SYSTEMS AND METHODS FOR DESTABILIZING AN AIRFOIL VORTEX

CROSS-REFERENCE TO RELATED APPLICATION

The present application is a continuation-in-part of U.S. application Ser. No. 10/784,067, filed on Feb. 20, 2004 now U.S. Pat. No. 7,100,875.

TECHNICAL FIELD

The present disclosure relates to alleviating the effects of vortices that form at the outer tips of wings and/or other aerodynamic surfaces.

BACKGROUND

Current airport capacity is largely controlled by the hours of operation (which are largely confined to daylight hours to prevent noise pollution in the airport environs) and the frequency with which planes can be brought in and out of the airport. A pacing item in landing and takeoff frequency is the time necessary for the dissipation of wake vortices produced by planes in motion. The size and intensity of wake vortices are determined by the size and weight of the aircraft, and can pose turbulent conditions in the wake of wide body airplanes. In worst case scenarios, these vortices can be strong enough to cause airplane crashes. This problem has been recognized for several decades, and a number of approaches have been suggested to alleviate this problem. However, many proposed solutions have proven to be ineffective or otherwise unsuitable for practical applications. Accordingly, there exists a need for improved techniques for handling the effects of wing tip vortices.

SUMMARY

The present disclosure is directed generally toward apparatuses and methods for the control of trailing wake flows. An aircraft system in accordance with one aspect includes an airfoil having first and second oppositely facing flow surfaces and a tip. The system can further include a vortex dissipation device carried by the airfoil. The vortex dissipation device can include a flow nozzle, a valve device, and a controller. The flow nozzle can be coupleable to a source of pressurized fluid, and can include an orifice positioned to direct a flow of fluid outwardly from the tip. The valve device can be coupled in fluid communication with the fluid flow nozzle to selectively control the flow passing through the orifice. The controller can be operatively coupled to the valve device to direct the operation of the valve device.

In further particular aspects, the controller can direct the valve device to deliver pulses of flow through the orifice, for example, at frequencies of from about 1 Hz to about 10 Hz. In still further particular aspects, the flow nozzle can be movable relative to the airfoil between a first position with the orifice directed upwardly, and a second position with the orifice directed downwardly. In still further aspects, the controller can direct the valve device to selectively activate different orifices at different times.

Further aspects are directed to methods for operating an airfoil system. One such method can include generating a tip vortex by passing an airfoil through the air while generating lift with the airfoil. The method can further include at least partially dissipating the vortex by directing multiple fluid pulses outwardly from a tip of the airfoil. In a particular aspect of this arrangement, directing multiple fluid pulses can include directing multiple fluid pulses through multiple orifices arranged in first and second rows, and the method can further comprise activating orifices of nozzles in the first row while deactivating orifices of nozzles in the second row, and activating orifices of nozzles in the second row while deactivating orifices of nozzles in the first row.

BRIEF DESCRIPTION OF THE DRAWINGS

FIGS. 9A, 9B, 9C-1, 9C-2, 9D-1, and 9D-2 illustrate the vortex that is shed from the wing tip in situations without activation of the vortex dissipating apparatus and with the activation of the vortex dissipating apparatus where the frequency of the cyclic movement of the direction of the jet air stream is at 10.7 Hz.

FIGS. 16A and 16B are schematic illustrations illustrating expected vortex behavior before and after activation of a system in accordance with an embodiment of the invention.

FIGS. 17A and 17B illustrate cross-flow velocity contours associated with the flow field initially shown in FIGS. 16A and 16B.

DETAILED DESCRIPTION

Figure 1:
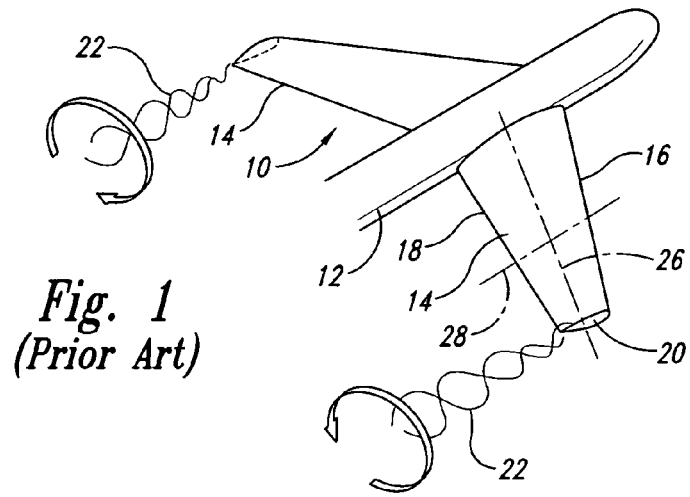
FIG. 1 is an isometric view showing an airplane shedding a vortex at each wing tip location.

Aspects of the present disclosure include airfoil vortex dissipating systems and related methods relating to the same. Airfoils in which the systems are incorporated typically have a leading edge, a trailing edge, an outer end portion, an upper aerodynamic surface, a lower aerodynamic surface, a spanwise axis, a forward to rear chord axis, and an alignment reference plane coincident with the spanwise axis and the chord axis. When the airfoil is functioning to create aerodynamic lift, a vortex is created at the outer end portion of the airfoil (e.g., the tip of the airfoil). The vortex has a vortex core axis, a main circumferential flow region and an outer perimeter flow region.

In one embodiment, the vortex dissipating apparatus includes a nozzle section which is at or proximate to the outer end portion of the airfoil, and has a nozzle discharge portion which in this embodiment is at an alignment location extending generally in a forward to rearward direction at, or proximate to, the outer end portion of the airfoil. The nozzle section is arranged to discharge a jet stream (e.g., a fluid jet) into the vortex. In one embodiment, the fluid jet is discharged in a lateral discharge direction having a substantial discharge alignment component generally perpendicular to the chord axis and parallel to the alignment plane.

A pressurized air inlet section can supply pressurized air to the nozzle section with the pressurized air being discharged from the nozzle section.

In embodiments of the present invention, the nozzle discharge portion is arranged to be actuated to move the lateral discharge direction back and forth, and in embodiments shown herein upwardly and downwardly between upper and lower end locations in a cyclical manner. In at least one embodiment, the lateral discharge direction of the fluid jet moves in cycles rotatably through an angle of at least as great as about one third of a right angle, or through an angle at least as great as about two thirds of a right angle or more.

In an embodiment, the nozzle discharge is arranged so that when the lateral discharge direction is at a generally central location between the upper and lower locations, the nozzle discharge portion is discharging the jet air stream so that the lateral discharge direction has a substantial alignment component generally perpendicular to the chord axis and generally parallel to the alignment reference plane.

In another embodiment, the nozzle discharge portion is arranged so that the lateral discharge direction is at a general central location between the upper and lower locations, and the nozzle discharge system is discharging the jet air stream so that the lateral discharge direction has a substantial alignment component slanting downwardly and outwardly from the referenced alignment plane.

In one mode of operation, the apparatus is arranged so that cyclic frequency of the back and forth movement of the discharge direction is sufficiently high so that dissipation of said vortex is accomplished by alleviating the intensity of the vortex. In different operating modes this cyclic frequency can be greater then 2 Hz, at least as great as 5 Hz, or as great as 10 Hz or greater.

In another mode of operation the vortex dissipating apparatus is arranged so that cyclic frequency of the back and forth movement of the lateral discharge direction is sufficiently low so that dissipation of the vortex is accomplished at least in part by accelerating instability which leads to vortex dissipation. This cyclic frequency can be at least as low as about 2 Hz, or as low as approximately 1 Hz or less.

Also, in yet another embodiment the nozzle discharge portion is arranged so as to have at least two nozzle discharge portions which discharge at least two jet air stream portions, with said jet air stream portions being moved cyclically back and forth in an out of phase relationship.

Aspects of the invention relating to movable discharge nozzles are described initially with reference to FIGS. 1-14E. Aspects of the invention relating to pulsed fluid jets are described with reference to FIGS. 15A-23. These aspects may also be combined in other embodiments, as is also described below.

To describe the above embodiments in more detail, reference is made to FIG. 1, where there is shown somewhat schematically the forward portion of an airplane 10 having a fuselage 12 and right and left wings 14. Each wing 14 has a leading edge 16, a trailing edge 18 and an outer edge tip portion 20. As illustrated in FIG. 1, there is shed from each outer edge portion 20 a vortex, indicated schematically at 22, which can be described as being a mass of rapidly spinning air.

Figure 2:
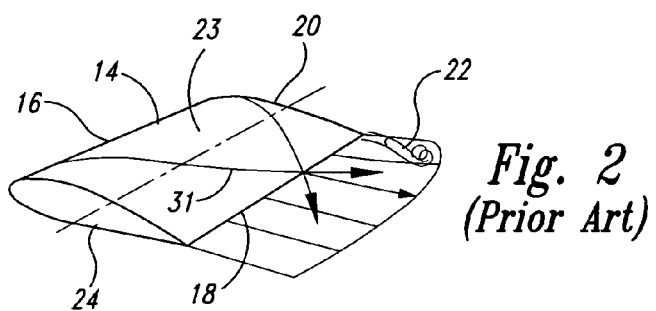
FIG. 2 is an isometric view of a section of an airfoil illustrating the flow pattern which results in the formation of the vortex.

To describe the manner in which a wing produces a vortex, reference is made to FIG. 2, which shows an outer section of the wing 14 having the leading and trailing edges 16 and 18 and the edge tip portion 20. The wing 14 has an upper aerodynamic surface 23, a lower aerodynamic surface 24, a spanwise axis 26 and a chord axis 28. For purposes of description, there will be designated an "alignment plane" which is generally horizontally aligned (with the airplane flying horizontally) and which is coincident with the spanwise axis 26 and the chord axis 28.

With further reference to FIG. 2, to describe briefly how the vortex 22 is formed in flight, there exists a pressure level differential between the upper and lower wing surfaces 23 and 24, and this results in a change in the direction (indicated at 31) of the spanwise velocity component across the surface of the trailing edge which separates the flow from above and from below the wing. This velocity gradient is the principal source of vorticity content with in the wake. The sheet of concentrated vorticity rolls up into two distinct counter-rotating vortex elements 22 that originate at the tips of the wing, as schematically shown in FIG. 1 and also indicated at 22 in FIG. 2.

Depending upon weather conditions, for large and heavy planes these vorticities are quite intense and they can persist for a relatively long time, which translates into relatively large distances, relative to the residual effect along its flight path. For example, the trailing wake of a relatively large transport airplane during approach might pose a danger to an airplane following in its flight path for about 1.5 minutes which corresponds to about 20 km distance in the spacing of the airplane. In a quiet atmosphere the vortices persist very long until their destruction through molecular and turbulent dissipation. Usually however, the mechanism that leads to the eventual vortex break up due to atmospheric perturbations is flow instability (often referred to as Crow instability, Crow, S.C., "Stability Theory for a Pair of Trailing Vortices," AIAA Journal, Vol 8, No. 12. pp. 2172-2179, December 1970). The onset of instabilities is hastened by ambient turbulence, wind and atmospheric stratification. These sources of excitations trigger the generation of sinusoidal waves along the cores of the vortex elements. The subsequent process of nonlinear amplification results in the breakup of vortex elements and leads to their destruction. Relative to quiescent conditions, the perturbations due to atmospheric disturbances and the ensuing instabilities shorten the lifespan of the vortices. Unfortunately, these instabilities usually evolve rather slowly and do not result in flow conditions that allow practical reductions in airplane separation.

During take-off and landing, high-lift devices are deployed and the trailing wake consists of multiple vortex elements developed by these high-lift devices. In those configurations, the dynamics of the individual vortices are more complex, but the destabilization caused by atmospheric disturbances is still the leading mechanism of vortex decay.

The trailing vortices generated by large aircraft can be a severe atmospheric disturbance to airplanes that are flying into their path. This situation is especially acute during take-off and landing since the flight segments are formed in a relatively narrow corridor. Moreover, the swirling flow of the vortex 22 is very intense at low speed.

Figure 3:
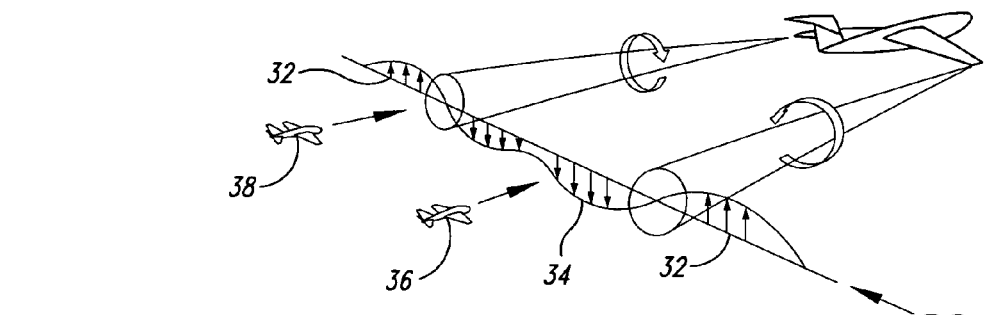
FIG. 3 is a somewhat schematic isometric view illustrating schematically the flow pattern of vortices generated and the effect of these on other aircraft.

These swirling flow patterns are illustrated somewhat schematically in FIG. 3, and it should be understood that FIG. 3 is not intended to be an accurate representation of the airflow associated with the vortex, but rather to show the overall pattern. It can be seen that at the outside portion of the vortex there is an up wash 32 and at the inside of the vortex there is a down wash 34. It can be seen that for an airplane 36 traveling between the two down wash zones 34, there is a loss of altitude (when landing) or a loss of rate of climb. For the airplane indicated at 38 that is traveling into the up wash 32, there can be imposed a roll moment on the airplane. For the airplane indicated at 40, moving transversely through the two vortices 22, there can be imposed substantial aerodynamic stresses on the airplane 40 by the sudden change in vertically oriented loads imposed on the airplane 40.

Figure 4:
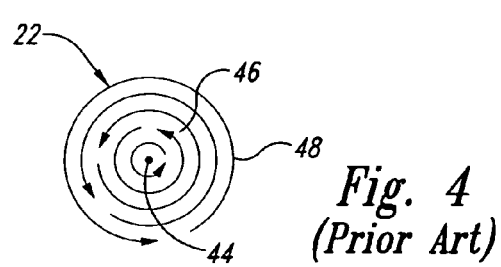
FIG. 4 is a cross sectional view of a typical vortex.

To facilitate the description of various aspects of these embodiments of the invention, the vortex that is generated from the wing tip is shown schematically in cross-section in FIG. 4, and shall be considered as having a vortex core 44, a main vortex flow region 46 surrounding the core, and an outer perimeter flow region 48 surrounding the main vortex flow region 46. Obviously, there are no sharp lines of demarcation between the vortex core 44, the main vortex flow region 46, and the perimeter flow region 48.

With the foregoing text being given as background information, there will now be a description of the embodiments of the invention. In the following description the term "airfoil" is meant to refer to the entire aerodynamic body, and it is not intended to mean a cross section or cross sectional configuration of the same. Also within the broader scope, it is meant to include various aerodynamic bodies, including a wing, trailing edge flaps, leading edge flaps or slats, winglets, control surfaces, etc.

The airfoil vortex dissipating system 50 of this embodiment along with its nozzle section 52, will be described in more detail later in this text with reference to FIGS. 6, 7, and 8. However, it is believed that a better understanding of the system 50 will be obtained by first giving a preliminary description of the function of this vortex dissipating system 50, and this will be done with reference to FIGS. 5A through 5D.

Figure 5A:
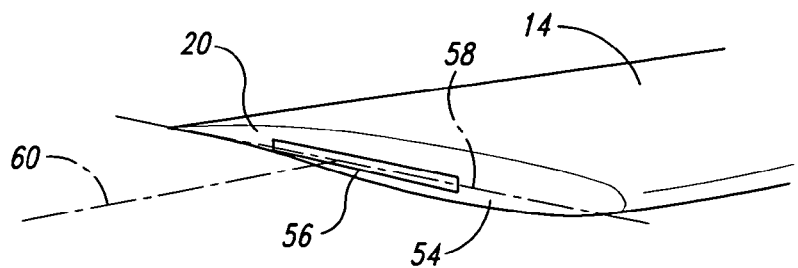
FIGS. 5A-5D are sequential views showing an air jet flow pattern of an initial embodiment of the present invention.

In FIG. 5A, there is shown the outer edge portion 20 of the right wing 14, and there is shown at 54 a nozzle alignment axis. At the location of that axis 54 there is a moveable coverplate or panel 56 which closes an air jet stream discharge opening, the perimeter boundary of which is indicated 58 in the FIG. 5A. There is also shown in FIG. 5A a lateral jet stream discharge axis 60 (hereinafter referred to as the lateral discharge direction 60) which has a substantial alignment component perpendicular to the nozzle alignment axis 54, and also has a substantial alignment component parallel to the aforementioned alignment plane which is defined by (and coincides with) the spanwise axis 28 and the chord axis 30. In the cruise mode of the airplane 10, the coverplate 56 can be in its closed position, and can be opened when the airplane is either landing or taking off and climbing.

Figure 5B:
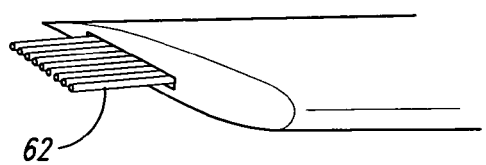
Figure 5C:
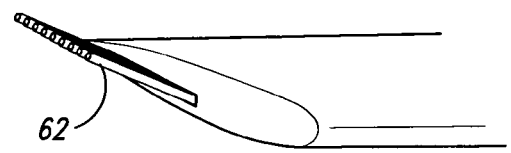

In FIG. 5B, there is shown the jet air stream 62 being discharged in a direction which is generally parallel to and also coincident with (or in proximity to) this lateral discharge direction 60. As indicated above, the discharge of the jet air stream 62 would normally occur only during the take-off or landing made. As will be disclosed in more detail later herein, the aforementioned nozzle section 52 can be operated so that the jet air stream 62 can be also discharged in a direction having an upward slant, as shown in FIG. 5C, and also a downward slant, as illustrated in 5D. Further, in the operating mode of this embodiment, the up-and-down movement between the positions of 5C and 5D can be done in different operating modes so that the jet air stream 62 rotates in up-and-down cycles at higher and lower frequencies. The effect of these is to contribute to the dissipation of the vortex 42, and this will be discussed in more detail later in this text.

Figure 6:
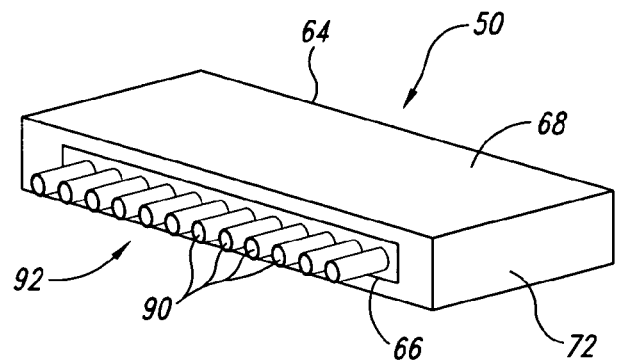
FIG. 6 is a somewhat schematic isometric view illustrating a nozzle section of an embodiment of the invention.
Figure 7:
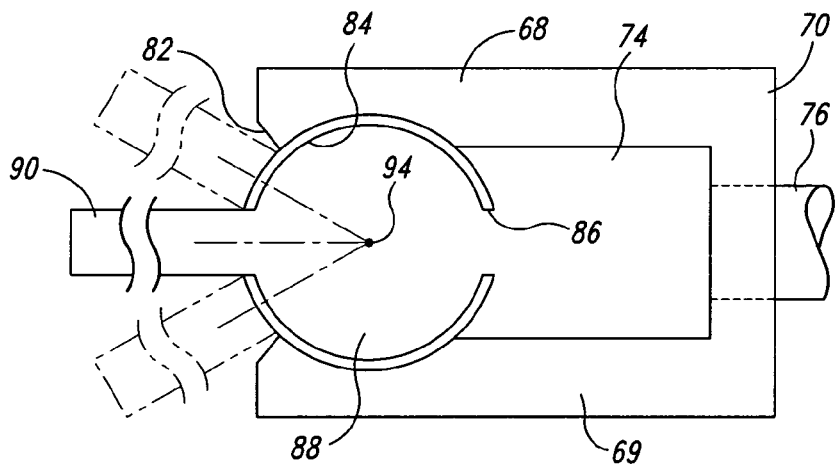
FIG. 7 is a sectional view taken along line 7-7 of FIG. 6.
Figure 8:
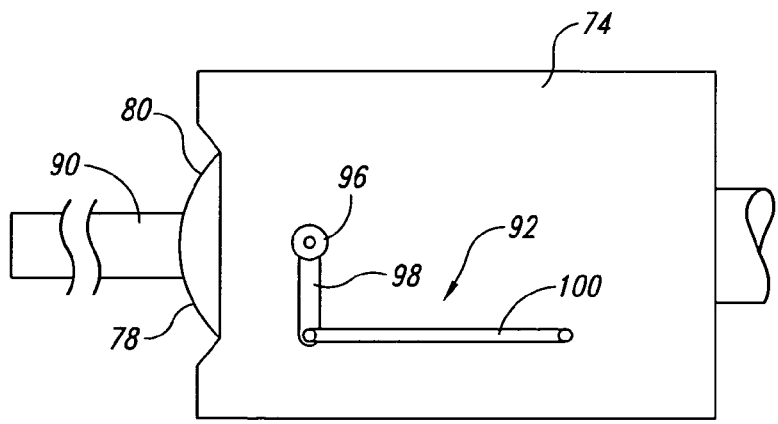
FIG. 8 is an end view of the nozzle section of FIG. 6.
Figure 9A:
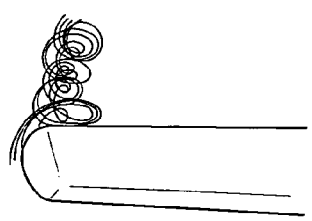
Figure 9B:
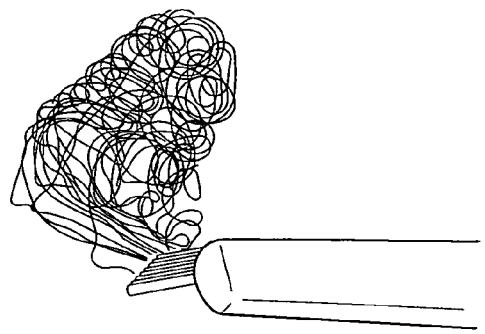
Figures 1, 9C:
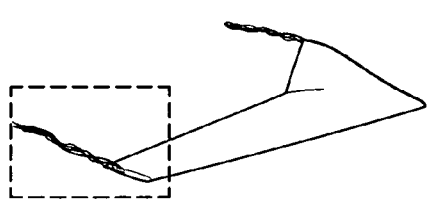
Figures 1, 9D:
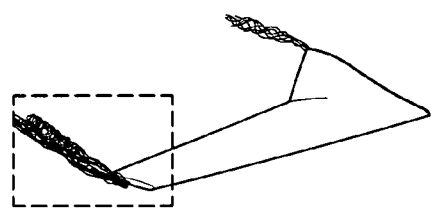
Figures 2, 9C:
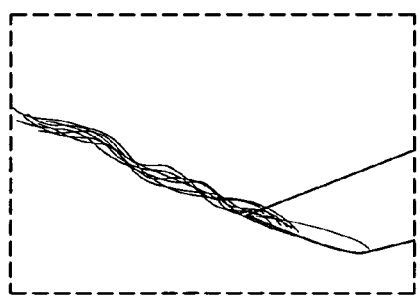
Figures 2, 9D:
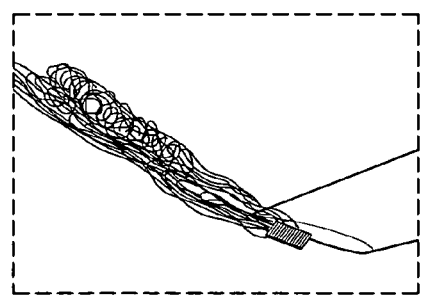
Figure 10A:
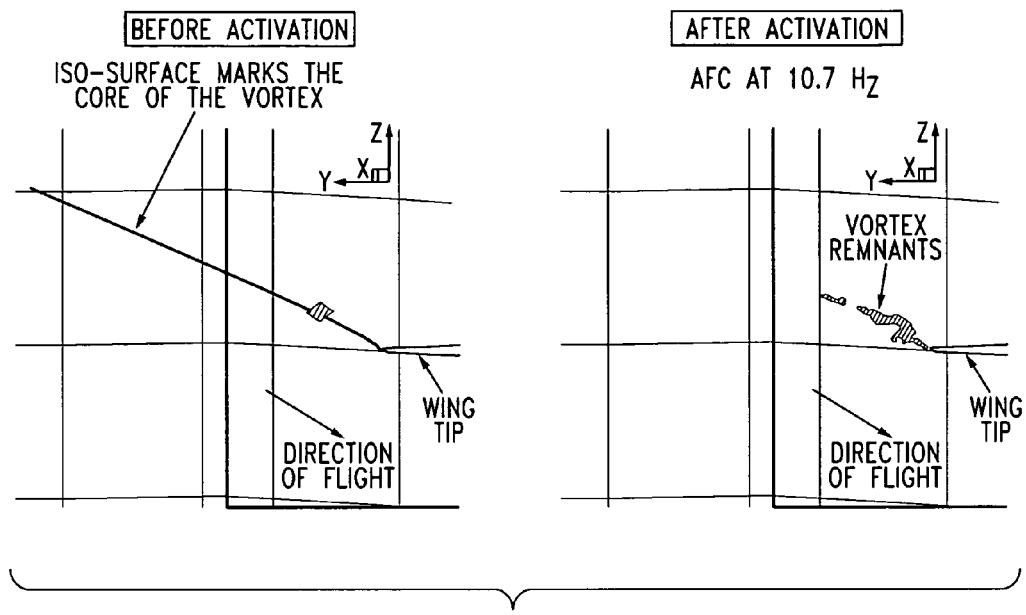
FIGS. 10A, 10B, and 10C display an iso-surface representing the vortex before activation of the apparatus and after activation where the operating frequency is 10.7 Hz.
Figure 10B:
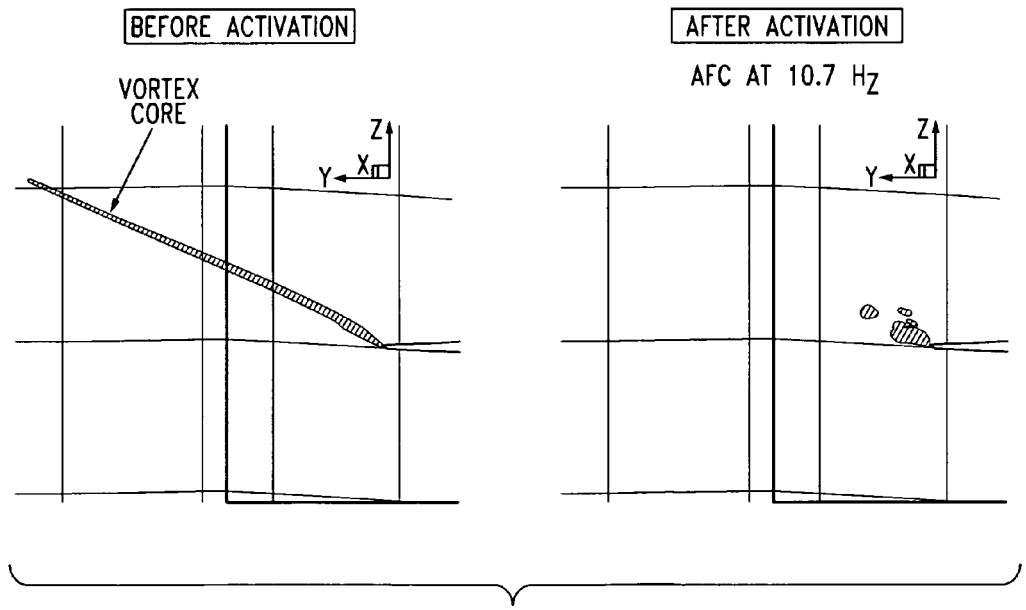
Figure 10C:
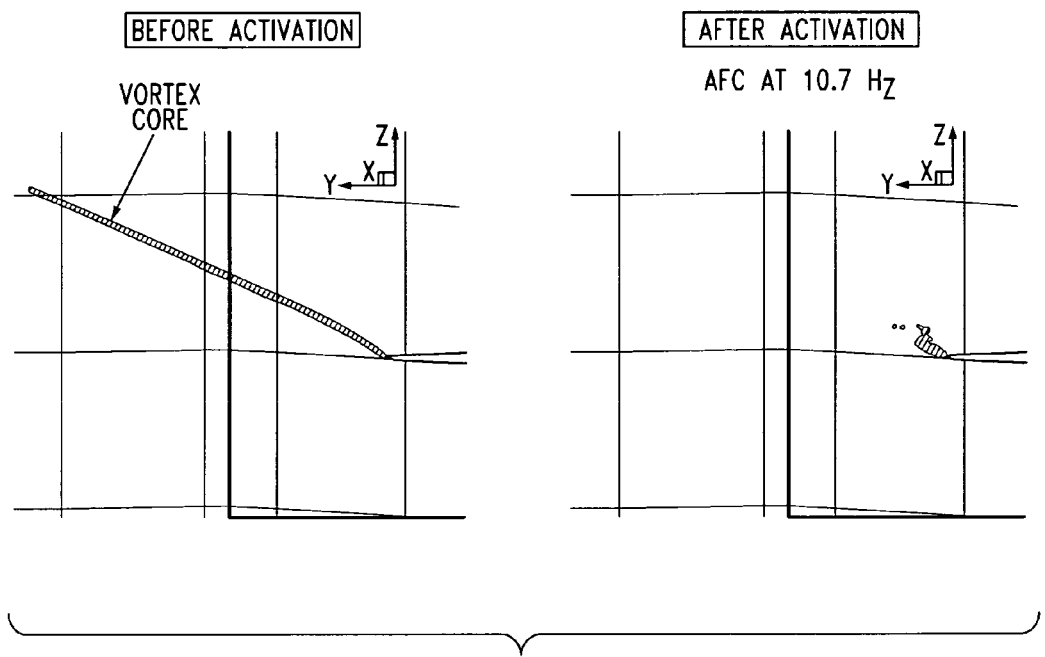

Reference is now made to FIGS. 6, 7, and 8 to describe the nozzle discharge section 52 in more detail. It is to be understood that FIGS. 6, 7, and 8 are somewhat schematic and are not intended to show an optimized structural configuration design, but rather to show a design having components which would perform the basic functions. In the situation where this design were to be actually implemented as part of an aircraft, then each of the components would be configured to match the design goals of being lightweight, structurally sound, functional and to accomplish the pressurizing, containment, and discharge of the jet air stream 62, and also to properly fit in the contours of the wing or other airfoil.

In FIG. 6, there is shown the basic components of the nozzle section 52 which are a housing section 64 (hereinafter called the housing 64) and a nozzle discharge section 66. As shown herein, the housing 64 is as a single elongate housing having upper or lower walls 68 and 69, respectively, a back wall 70 and end walls 72 that collectively define a pressurized plenum chamber 74. This housing 64 is positioned within the outer end portion 20 of the wing 14, and accordingly it can be contoured to fit properly within the confines of that portion of the wing 14.

There is a pressurized air inlet 76 which receives pressurized air from a suitable source. For example, the pressurized air could be bled from the compressor section of a jet engine or from some other source. Also, while the inlet 76 is shown is a single inlet, this could be arranged in manner of a manifold with multiple inlets or some other configuration.

The nozzle discharge section 66 has an overall elongate configuration and comprises a nozzle mounting member 78 which has the overall configuration of an elongate cylindrical wall 80, which fits snugly in an elongate forward end opening region 82 formed at the forward part of the housing 64. This end opening region 82 comprises two oppositely positioned cylindrically curved surfaces 84 which match the configuration of the cylindrical wall 80, with the curved surfaces 84 forming a substantially airtight seal with the cylindrical wall 80.

The elongate cylindrical wall 80 is closed at opposite ends, and has one or more rear openings 86 which open to the plenum chamber 74 of the housing 64 and open to a nozzle plenum chamber 88 that is defined by the cylindrical wall 80.

Located at the forward portion of the cylindrical wall 80 is a plurality of individual nozzle members 90, which collectively form a nozzle discharge portion 92 of the nozzle discharge section 66. These nozzle members 90 are shown in FIG. 6 to be aligned with one another at the lateral discharge axis 60, so that these collectively form the aforementioned jet air stream 62. Thus, when pressurized air is directed through the pressurized air inlet or inlets 76 into the plenum chamber 74 and from there into the nozzle plenum chamber 88, the pressurized air is discharged through these nozzle members 90 to form this jet air stream 62.

The cylindrical wall 80 is rotatably mounted in the cylindrical curved surfaces 84 that define the elongate forward end opening region 82 of the housing 64, with the axis of rotation being indicated at 94. As shown in the broken lines of FIG. 7, this enables the nozzle members 90 to be moved from a middle alignment location where the nozzles 90 are directed horizontally upwardly or downwardly to the broken line positions shown in FIG. 7. In this embodiment, the amount of upward rotation could be, for example, one-third of a right triangle (e.g., about 30 degrees) and downwardly through that same angular rotation, so that the total path of travel could be, for example about 60 degrees.

To move the nozzle members 90 to their various positions of angular orientation, a suitable actuating mechanism can be provided, such as shown schematically in FIG. 8 at 92. The nozzle mounting member 78 connects to a shaft 96 that connects to a lever arm 98 that is in turn moved by an actuating arm 100. In other embodiments, various other devices can be used to change the position of the nozzle mounting member 78, such as a bell crank, a gear drive, or an electric, pneumatic, or hydraulic positioning device. For purposes of brevity, these various design options will not be described in detail herein.

Also, there could be various arrangements to direct the pressurized air to the nozzle members 90. For example, the pressurized air inlet 76 could be connected directly to the nozzle mounting member 78, leading through the cylindrical wall 80, or possibly being attached by a rotary fitting to an end wall of the cylindrical mounting member 78. This arrangement would eliminate the present configuration of the housing 64 having the plenum chamber 74. With the constraints of having the nozzle assembly 50 being positioned on the outer edge portion 20 of the wing, it may be more desirable to have the housing 64 in a configuration which would be compatible with these space restraints and also provide a plenum chamber of sufficient volume to give the proper pattern of pressurized air discharge through the nozzle members 90.

With regard to positioning the nozzle assembly 52, the housing 64 and the nozzle mounting member 78 may be at a fixed location in the outer edge portion 20 of the wing 14. In this instance, when the vortex dissipating system 50 is to become operational, the aforementioned coverplate 56 is moved away from the air jet stream discharge opening 58 so that the nozzle members 90 are able to direct the air jet stream 62 through the opening 58 so that the jet air stream 62 is discharged into the vortex 42.

The coverplate or panel 56 can be moved from its covering position to an open position in various ways. For an example, this coverplate 56 could have a curved configuration and be movable so that it will slide out of the opening region and into a stowed position.

In airfoils such as the wings of the airplane, the outer end portion has in plan view, a moderate forward to rear outward curve so that at the mid-length of the curved outline of the end tip of the wing is positioned a short distance further outwardly from the fuselage. To place the nozzle members 90 relatively close to outer edge portion of the wing or other airfoil, the alignment position of the nozzle members 90 would be in a moderate curve. Therefore, the configuration shown in FIG. 6 could be modified to place these nozzle members 90 in a curve matching that of the outer edge of the wing or other airfoil, and yet be able to rotate upwardly and downwardly. To obtain this configuration, there are various options. For example, instead of making the nozzle mounting member 78 as a single structure extending the entire length of the housing 64, the nozzle mounting member 78 could be arranged in a plurality of individual segments which can be rotated about slightly different axes of rotation 64 so that these would match the outer curvature of the line of the wing tip more closely. Other arrangements would be available, and since these are well-known with those skilled in the art, these will not be elaborated on in this text.

As indicated earlier, when the airplane 12 is in the cruise mode the vortex dissipating system 50 is not used and remains concealed behind the coverplate 56 in the wing. Then the coverplate 56 would be moved to the open position and the vortex dissipating system 50 would generally be used in the takeoff and landing mode when it is highly desirable to hasten the decay of the two wing tip vortices.

With the jet air stream 62 being injected into the vortex 22 at this location and at the orientation and direction as described above, the entry of the jet air stream 62 into the vortex is at a location at which the core of the vortex is forming, with the laterally outward and upward curved vortex flow of the air from the lower surface of the airfoil taking place around the core of the vortex that is forming. The analysis done thus far indicates that the entry of the jet air stream 62 at this location is particularly effective in affecting the air flow in the developing vortex so that the overall effect is to begin the dissipation at a critical location so as to cause substantial hastening of the decay of the vortex.

Beyond this, there is, as described with reference to FIGS. 5A-5D the mode of operation where the nozzle mounting member 78 is rotated cyclically up and down so that the nozzle members 90 move to the upper position shown in FIG. 5C and then through the intermediate position of 5B down to the lower position of 5D and back up would lead to the position of 5C in continuous cycles.

The results achieved by this embodiment of the invention were simulated and analyzed by a computational fluid dynamics procedure. The effectiveness of the operation was evaluated for a wing mounted on a vertical wall with a free stream Mach number of 0.25 at an angle of attack at eight degrees, so as to represent final approach conditions. This mode of operation results in a coherent wake with strong tip vortices. It was found that when this embodiment of the present invention as described above is utilized, the flow is affected in a manner that the vortex is significantly diffused.

In the case where the nozzles 90 are moved together up and down in the range of 30 degrees above and 30 degrees below the nozzle alignment axis 74, at a frequency of 10.7 Hz (one cycle in 0.093 seconds), the effect on the vortex is represented by the streakline traces of the wing tip as illustrated in FIGS. 9A, 9B, 9C-1, 9C-2, 9D-1 and 9D-2. In FIGS. 9A, 9C-1 and 9C-2, there is no ejection of the jet air stream 62 into the vortex, and FIGS. 9B, 9D-1 and 9D-2 represent the vortex with the ejection of the jet air stream 62 in the up and down sixty degree motion at 10.7 Hz. These "snapshots" demonstrate that the intermittent mixing provided by the cyclic motion of the jet perturbs the flow in the tip region and alters the development of the trailing vortex by reducing the strength and diffusing it in the cross plane.

There are several measures that can be used to track vertical activity. The far field wake structure is presented in FIGS. 10A, 10B, and 10C, where the tip vortex is tracked by the total-pressure loss, the cross-flow and the streamwise component of the velocity. The vortex core is represented by iso-surfaces of the respective flow properties with the clear indication that the strength of the vortex is significantly reduced due to the moving jet.

Figure 11A:
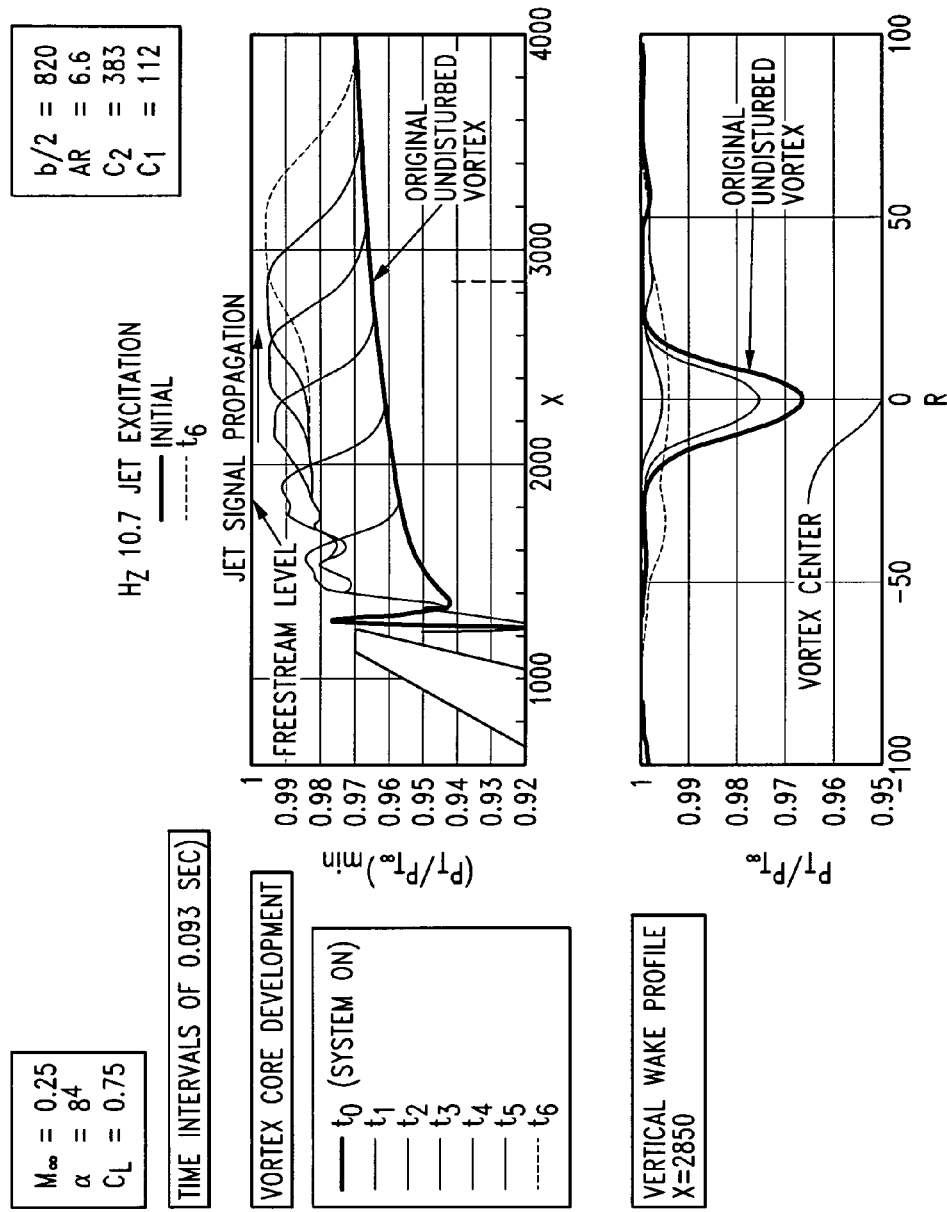
FIGS. 11A, 11B, and 11C are graphs presenting the development and dissipation of the vortex at the operating frequency of 10.7 Hz.
Figure 11B:
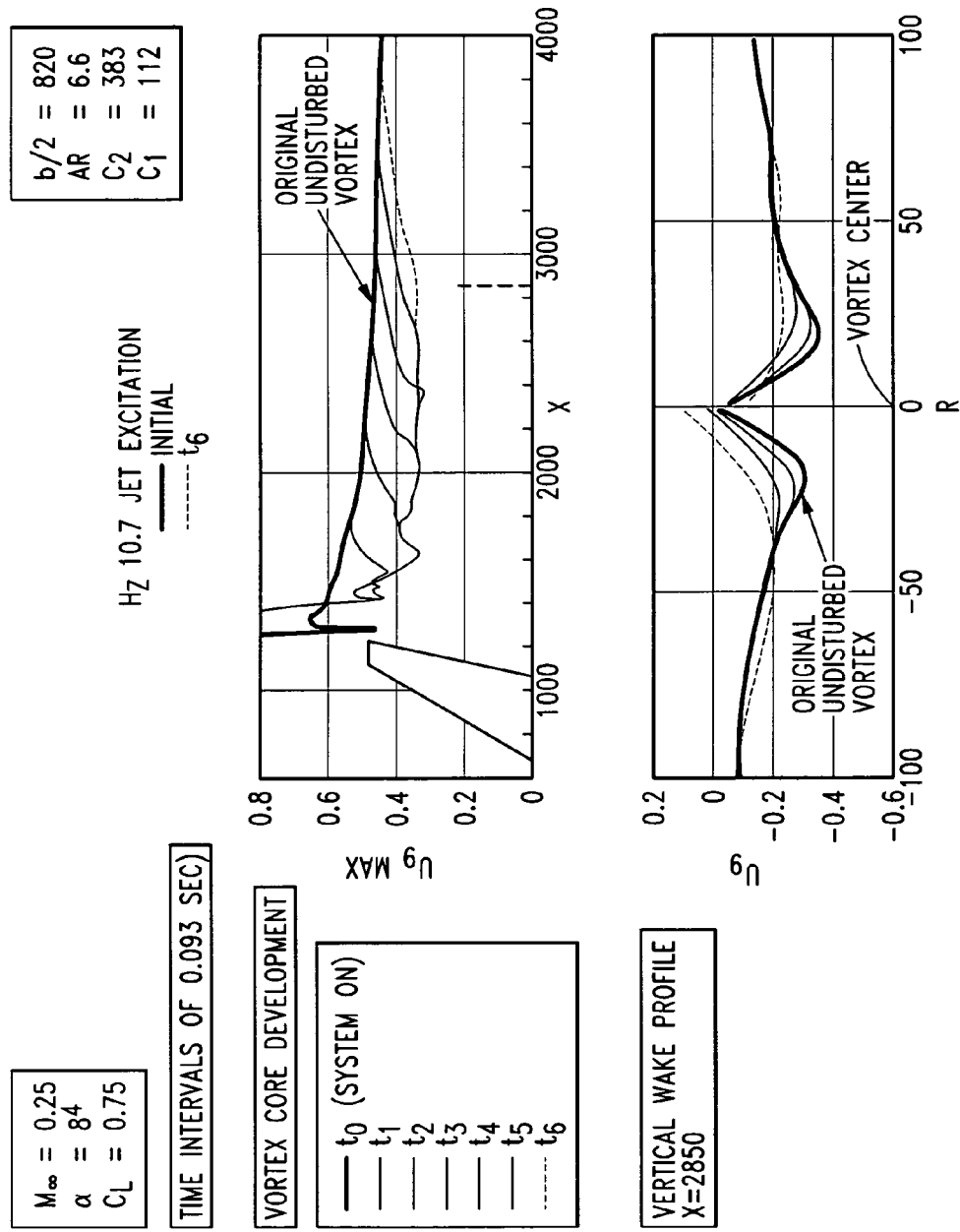
Figure 11C:
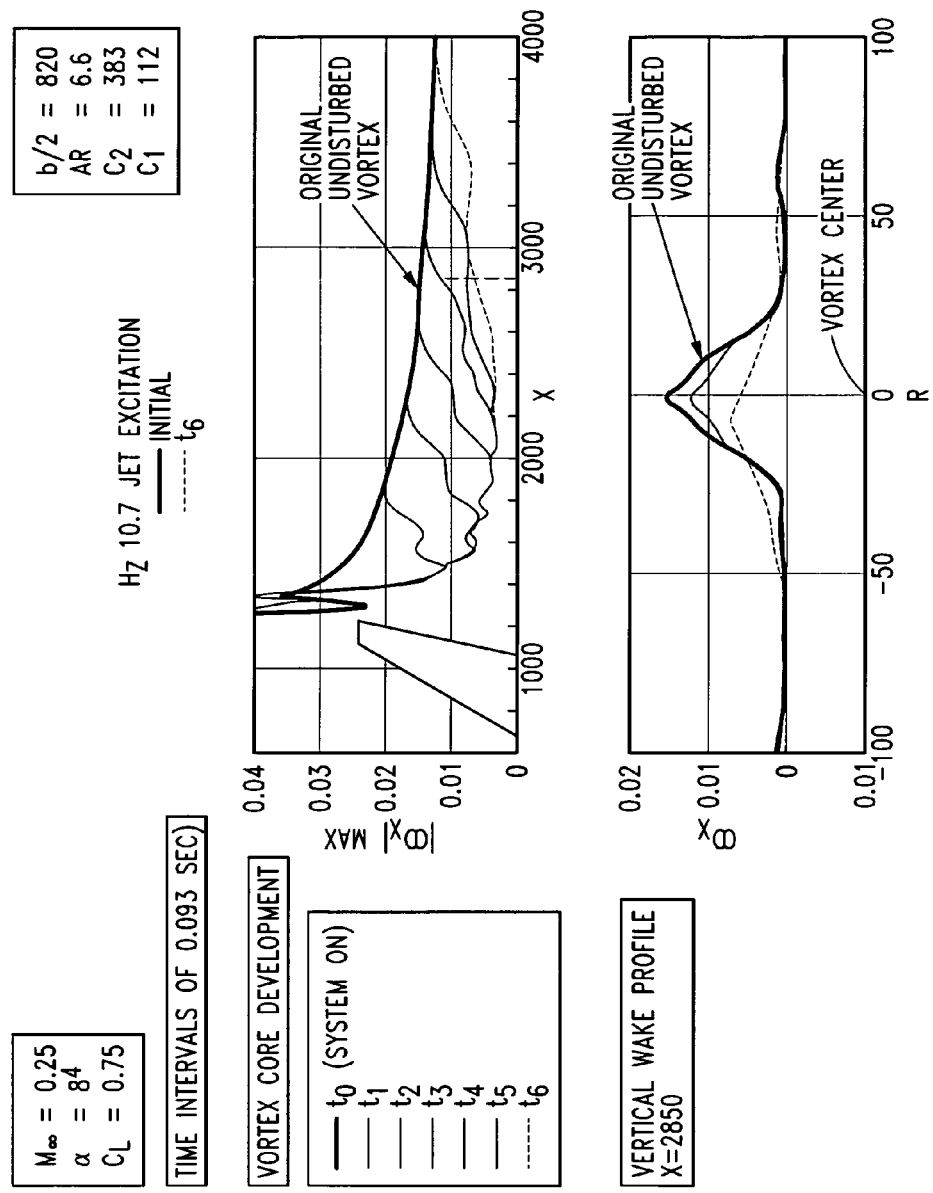

Diagnostics of flow development along the vortex at a frequency of 10.7 Hz core is shown in FIGS. 11A, 11B and 11C. Flow properties at a sequence of time intervals of 0.093 seconds from the instance of jet activation are shown along the vortex core in the upper plots. Also, the characteristics along a vertical line which passes through the vortex core at x=2850 are shown in the lower plots. The undisturbed vortex is described by the thick solid curves. The other curves represent the impact of the control mechanism on vortex characteristics at progressive time intervals with the signal traveling downstream (in the positive x direction). The front of the perturbation wave corresponds to the last snapshot in the time sequences and it is represented by the dashed curve. The dashed line describes the state of the vortex at 0.558 seconds from the start of jet application. The results indicate that the active system is very effective in reducing vortex strength as measured by the total-pressure loss, the cross-flow velocity (represented by the tangential component of the velocity) and the streamwise component of the vorticity.

Figure 12A:
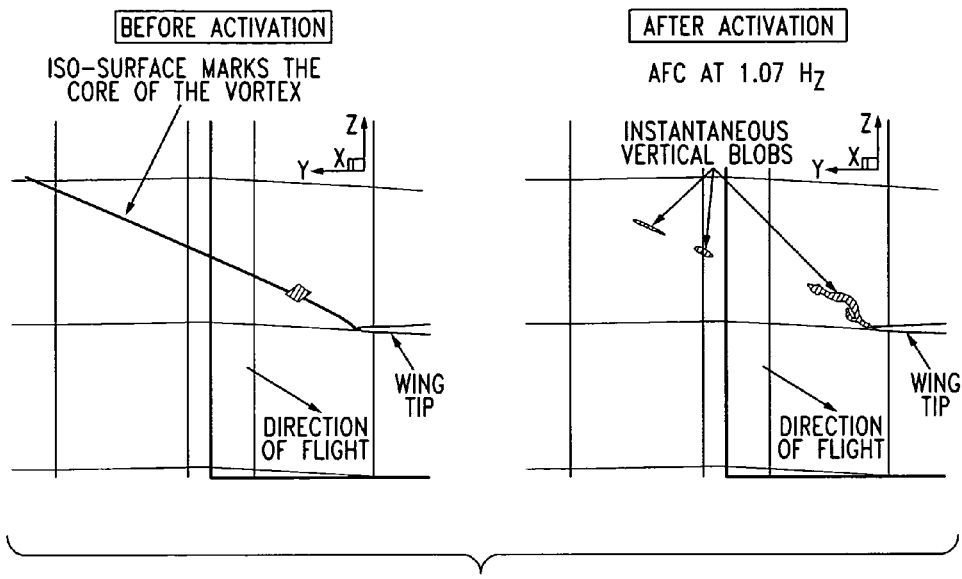
FIGS. 12A, 12B, and 12C are iso-surface representations similar to FIGS. 10A, 10B, and 10C, except that the operating frequency is 1.07 Hz.
Figure 12B:
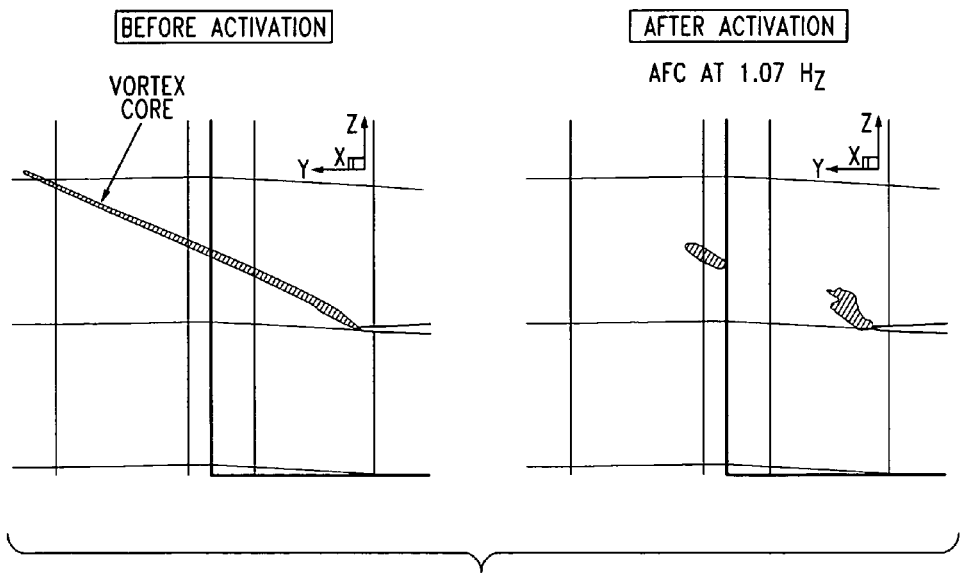
Figure 12C:
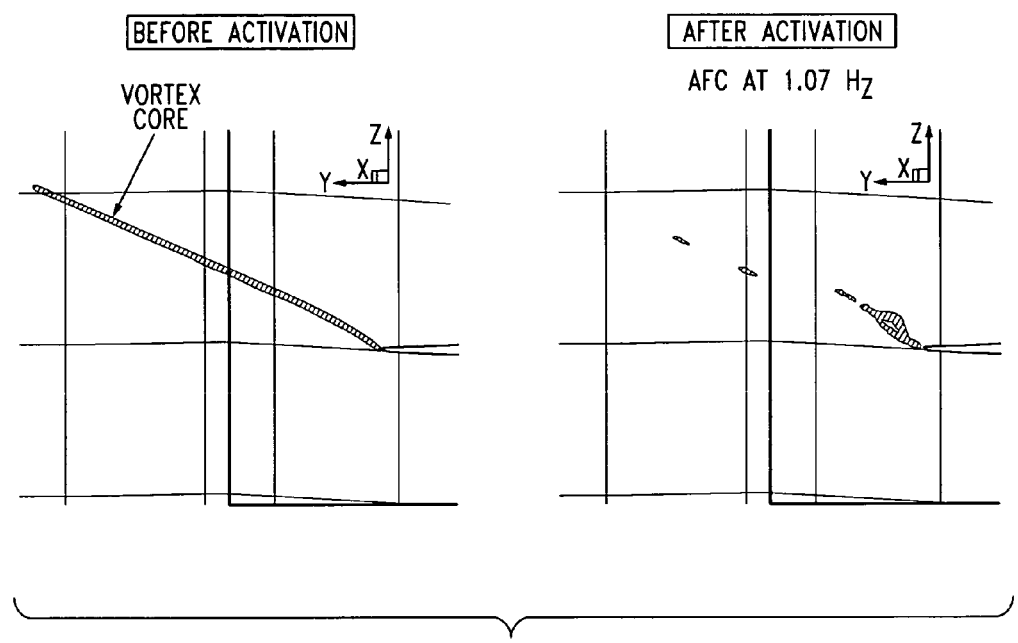

The up-and-down cycles of the nozzles 90 can also be effectively used at a lower frequency, such as approximately 1 Hz (i.e., one cycle of up-and-down motion in a little less than one second). The effect of this was analyzed by comparing the undisturbed vortex and comparing this with operating the vortex dissipating apparatus of the present invention at the 1.07 Hz frequency. The results of operating at 1.07 Hz are shown in FIGS. 12A, 12B, and 12C, which show that the oscillating jet air stream 62 introduces periodic disturbances along the vortex which propagate downstream. This continuous excitation results in the instability and destruction of the individual vortex segment.

Figure 13A:
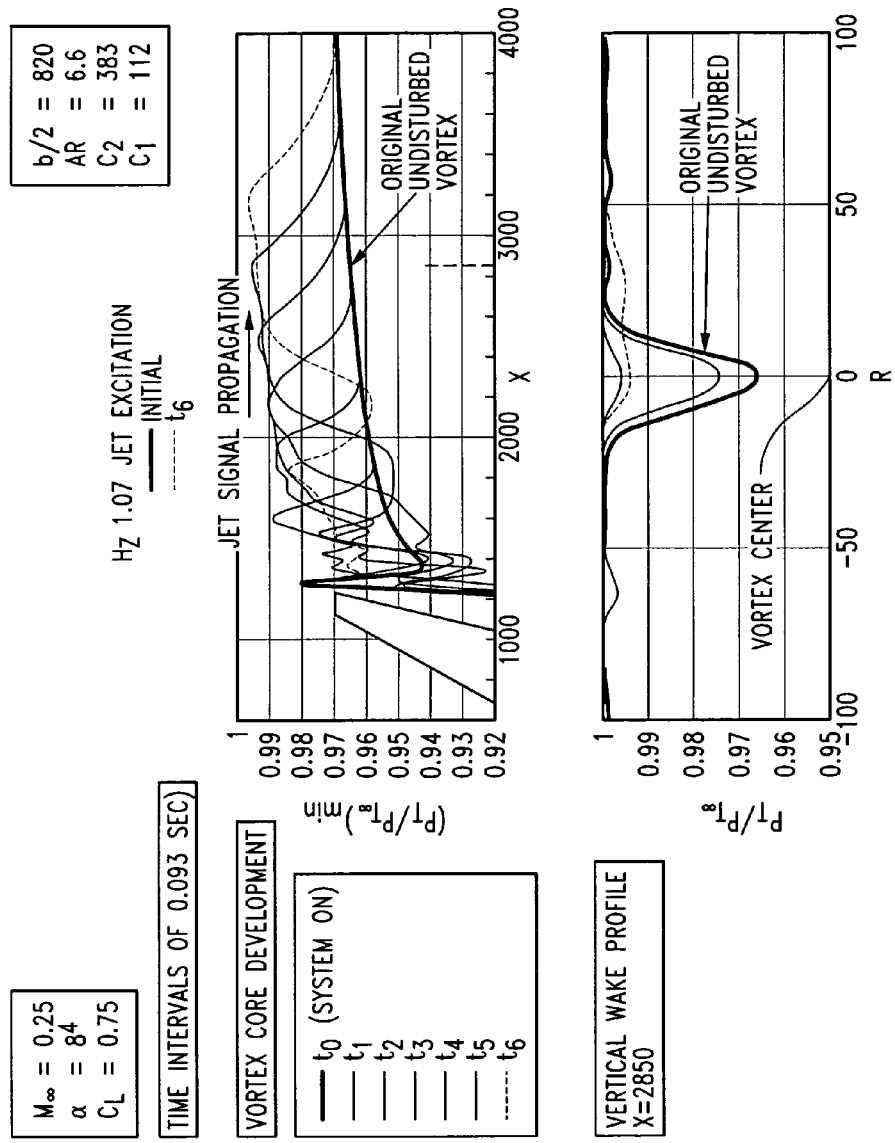
FIGS. 13A, 13B, and 13C are graphs similar to FIGS. 11A, 11B, and 11C, with the apparatus operating at a frequency of 1.07 Hz.
Figure 13B:
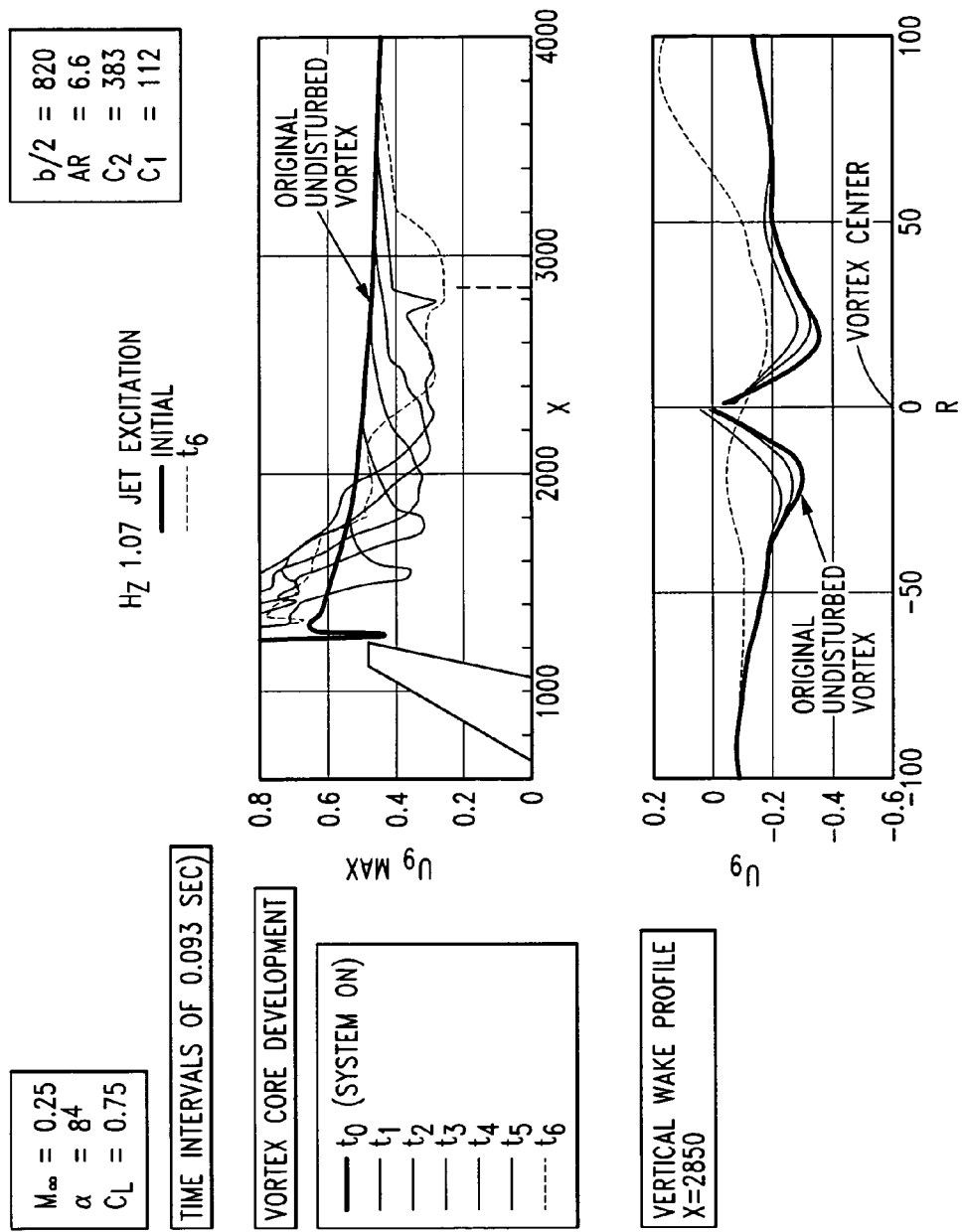
Figure 13C:
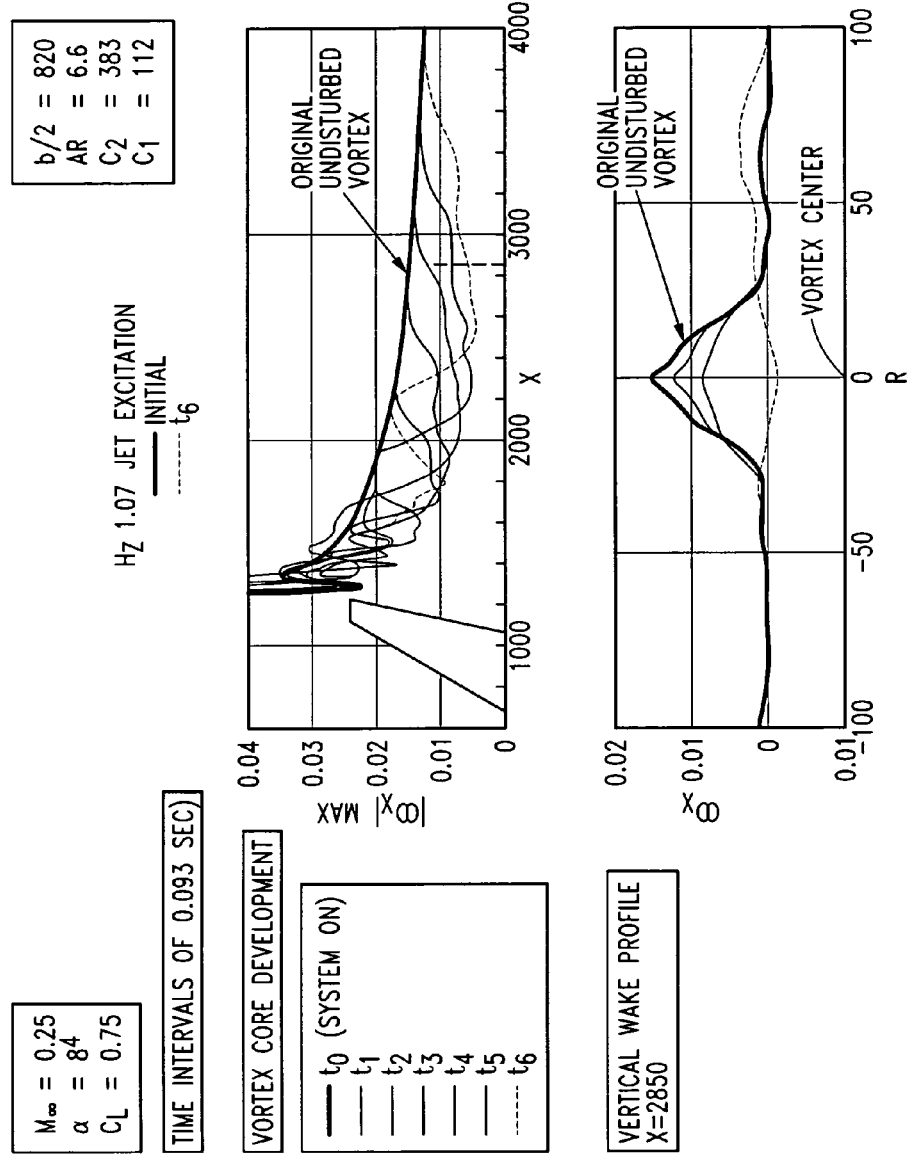

FIGS. 13A, 13B and 13C describe the perturbation wave along the vortex filament at various time intervals from the start of the jet application. It is shown that periodically, the total-pressure loss is reduced to less than 0.5%, which translates to about 85% reduction in the original vortex strength. The maximum tangential velocity is periodically reduced to about 50% of the original undisturbed vortex. Similarly, the maximum vorticity is being reduced by about two thirds. In practical terms, considering the substantial reduction in cross flow realized by using active control, a following aircraft will experience a bumpy flight but it will not be subject to a hazardous rolling motion.

Figure 5D:
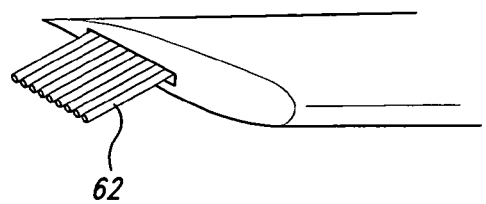

Reference is now made to FIGS. 14A, 14B, 14C, 14D and 14E. These are sequential views which illustrate a similar method as shown in FIGS. 5B, 5C and 5D, but with some differences. In this instance, the jet nozzles 90 are separated into forward and rear sections, with each forward and rear section being able to move upwardly and downwardly in a pattern different from the other set of nozzles 90.

Figure 14A:
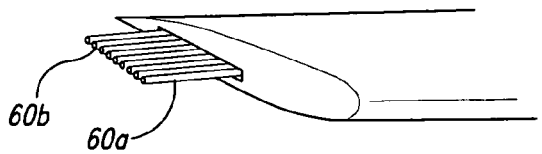
FIGS. 14A, 14B, 14C, 14D, and 14E are sequential views similar to FIGS. 5A-5D, but showing a further embodiment of the present invention in which the jet air stream has two jet air stream sections which move back and forth in out of phase relationship.
Figure 14B:
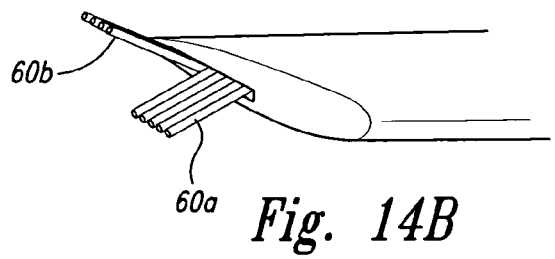
Figure 14C:
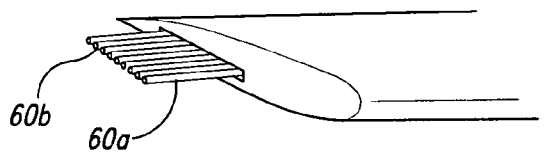
Figure 14D:
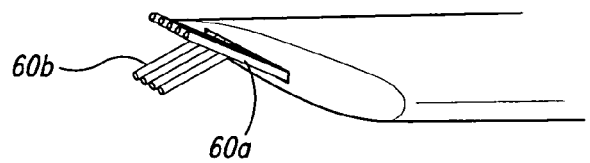
Figure 14E:
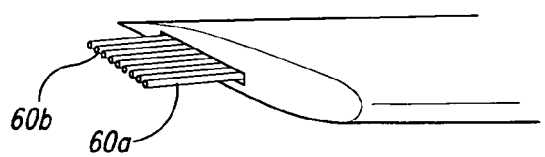

In FIG. 14A, there is shown a forward set of jet air stream portions 60a and a rear set of jet air stream portions 60b. Both of these are the same position as shown in FIG. 14A. As shown in FIG. 14B, the forward set 60a has moved downwardly 30 degrees, while the rear set 60b has moved upwardly 30 degrees. Then in 14C, the two sections of jet air stream portions 60a and 60b have reversed their direction of orientation and are moving more toward the horizontal position and in FIG. 14C and moving through the horizontal position but still rotating in opposite directions. As shown in FIG. 14D, they have moved to the position where the forward jet air stream portion 60a has moved upwardly 30 degrees, and the rear jet air stream portion 60b has moved downwardly 30 degrees. Then as shown in FIG. 14E, the two jet air stream portions 60a and 60b are moving at a reverse direction and are passing through the horizontal position at the same time, but traveling in opposite directions. Thus, this air jet stream oscillation forms what can be termed a scissors pattern.

Also, the angular orientation of the air jet stream can be shifted angularly from that shown in FIGS. 5A-5D. Instead of having the middle position be horizontal (i.e., parallel with the reference plane of the airfoil, the neutral position is slanted outwardly and downwardly at 30 degrees. Thus, in moving upwardly to the upper location, the jet air stream would be horizontal and in rotating to the lower position, the air jet stream would be slanting downwardly and outwardly at an angle of 60 degrees from the horizontal. It has been found that in this mode of operation, quite satisfactory results have been accomplished.

In at least some of the embodiments of the present invention, the nozzle section is positioned at an alignment location extending in generally a forward to rear direction at, or proximate to, the outer end portion of the airfoil. A length dimension of the region of where the air jet stream is discharged can be, for example, one third of a distance of chord length at the outer tip end portion of the airfoil, and in a broader range between approximately one quarter to one half of the chord length. However, within the broader scope of the present invention, this could be increased to, for example, 60%, 70%, 80%, 90% or 100% of the chord length, or it could be 35%, 30%, 25%, 20%, or conceivably 15% of the chord length at the outer tip of the airfoil.

The velocity of the jet air stream as discharged from the nozzle members 90 could be, for example, about Mach 0.62. However, depending upon other various factors, this could increase values up to Mach 0.7, 0.8, 0.9, or possibly greater. Also this could be decreased, for example, to Mach 0.6, 0.5, 0.4, 0.3, or possibly lower.

Also, the jet air stream with its back and forth motion could, within the broader scope of the embodiments be directed at different angular orientations and moved back and forth through different angular orientations and/or directed into other locations of the air flow forming the vortex.

In one arrangement of the vortex discharge portion 52 of the nozzle section 50, there is a plurality of nozzle members positioned along the alignment location. Each of the nozzles may be, for example, a simple conversion nozzle or a convergent/divergent nozzle if higher velocities are required. The cross section of the nozzle can be a circular or other suitable shape. The shape of the cross section of the nozzle can vary along nozzle length (for example, it can vary from a circular section to an elliptical section at the nozzle exit). The nozzle and distribution ducting downstream of the actuation system can be designed to minimize pressure losses, using techniques well known to those skilled in the art. However, within the broader scope of these embodiments, there could be a more elongate nozzle discharge portion more in the form of a continuous slot or slots having a greater length dimension than width dimension.

In one embodiment, the system is designed for a 600,000 pound airplane. In one design the calculated design parameters are as follows. The total chord wise length of the nozzle section is 43 inches, and it has 13 evenly spaced circular discharge orifices, each having a diameter of 3.2 inches. The velocity of the air that is discharged as the jet air stream is discharged at Mach 0.62.

In another design, for the same 600,000 pound airplane and with the discharge velocity being at Mach 0.62, the total length of the nozzle discharge section is 35 inches, and there are nine nozzle members each having an inside diameter of the discharge orifice of 3.9 inches.

In yet a third design, with the same airplane weight and air jet discharge Mach number, the total length dimension of the nozzle discharge section is 37 inches, and there are ten nozzle members, each having an inside diameter of the discharge orifice of 3.7 inches.

FIGS. 15A-23 illustrate vortex dissipation devices and expected resulting flow patterns in accordance with further embodiments of the invention. In an aspect of at least some of these embodiments, the nozzles that deliver the jet flows to break up or otherwise dissipate wing tip vortices can have a fixed configuration. Accordingly, the flow delivered from these nozzles can have a mass flow rate that varies with time, e.g., by having the flow pulsed through the nozzles. In another aspect of these embodiments, the time-varying nature of the flow emanating from these nozzles can be combined with the spatial variation of the nozzle positions, described above. Further details of manners in which the time-varying nature of the airflow through the nozzles may be controlled are described below.

Figure 15A:
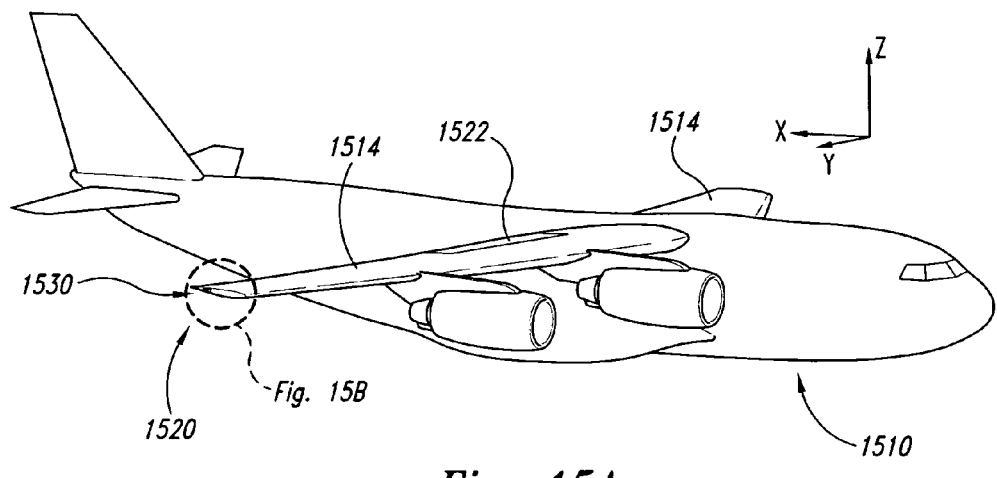
FIG. 15A is an isometric illustration of an aircraft having a vortex dissipation device configured in accordance with another embodiment of the invention.

FIG. 15A schematically illustrates an aircraft 1510 having wings 1514 on which vortex dissipation devices 1530 are positioned. In one aspect of this embodiment, the aircraft 1510 has a high-wing configuration, but the aircraft on which the vortex dissipation devices are installed can have any of a wide variety of other suitable configurations as well, including, but not limited to the configuration shown in FIG. 1. In any of these embodiments, the wings 1514 or other airfoils have oppositely facing upper and lower surfaces, a wing root at the wing body junction, and an outboard wing tip 1520. The vortex dissipation device 1530 can be mounted at or proximate to the outboard wing tip 1520 of each wing 1514. In other installations, the vortex dissipation device 1530 can be mounted to the tips of other airfoils, in addition to or in lieu of the wing 1514. Such other airfoils can include, for example, trailing edge devices (e.g., trailing edge flaps 1522, ailerons, flaperons or other deployable devices), leading edge devices (e.g., leading edge slats), aircraft control surfaces (e.g., aircraft elevators and/or horizontal stabilizers), rotorcraft blades, and/or canards. Further details of features of the vortex dissipation device 1530 are described below. The size, shape and configuration of many of these features can be tailored to the specific aircraft and airfoil on which the vortex dissipation device 1530 is installed. Accordingly, certain aspects of the devices and methods described on the following discussion and related Figures may have other arrangements in other embodiments.

Figure 15B:
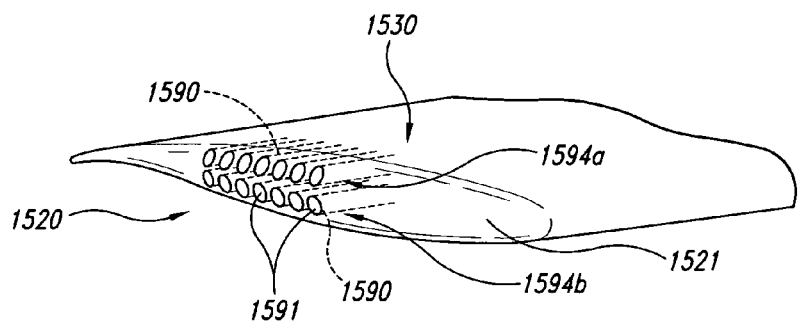
FIG. 15B is an enlarged isometric illustration of a portion of the aircraft shown in FIG. 15A.

FIG. 15B is an enlarged, isometric illustration of the wing tip 1520 and the vortex dissipation device 1530 shown in FIG. 15A. The wing tip 1520 can include a tip surface 1521 that can be flat in some embodiments, hemicylindrical in other embodiments, and curved in multiple dimensions and about multiple axes in still further embodiments. In any of these embodiments, the vortex dissipation device 1530 can include one or more nozzles 1590 (fourteen are shown in FIG. 15B for purposes of illustration), each having a nozzle orifice 1591. In a particular aspect of this embodiment, the nozzle orifices 1591 are positioned to be generally flush with the tip surface 1521. In other embodiments, the nozzle orifices 1591 can have other arrangements (e.g., slightly recessed from the tip surface 1521). The nozzle orifices 1591 can be located behind a movable door when the nozzles 1590 are not in use, in a manner generally similar to that described above with reference to FIG. 5A. For purposes of illustration, such a cover is not shown in FIG. 15B. The nozzle orifices 1591 can be arranged in particular patterns, for example multiple rows 1594 (shown in FIG. 15B as a first, e.g., upper, row 1594a and a second, e.g., lower, row 1594b). The flow of air or another gas directed through the nozzles 1590 can be controlled and varied in a time-dependent manner to hasten the dissipation of vortices emanating from the wing tip 1520, as described further below with reference to FIGS. 16A-22.

FIGS. 16A and 16B illustrate results of a computational fluid dynamic (CFD) simulation of a simplified version of the wings 1514 shown in FIGS. 15A-B. To simplify the CFD simulation, the fuselage of the aircraft 1510 (FIG. 15A) was eliminated, and one wing 1514 was analyzed as though it were mounted to a vertical wall. For purposes of illustration, the wings 1514 are shown together reflected about a plane of symmetry that corresponds to the vertical wall. This simplification is not expected to have a significant impact on the simulation of the wing tip vortices. The simulation results shown correspond to a freestream Mach number of 0.25 and an angle of attack of 8°.

FIG. 16A illustrates streaklines 1592a that correspond to the flow field resulting when the vortex dissipation device 1530 is inactive, i.e., when no fluid flow is actively directed outwardly through the nozzles 1590 (FIG. 15B). The streaklines 1592a represent the flow of particles that are initially positioned at the wing tips 1520. As shown in FIG. 16A, the flow field includes relatively strong wing tip vortices indicated by streaklines 1592a that are tightly wrapped about a core axis and proceed in a tightly wound helix downstream from the wing tips 1520.

FIG. 16B illustrates streaklines 1592b corresponding to the flow expected when pressurized air is provided through the nozzles 1590 (FIG. 15B). In FIG. 16B, flow is pulsed through all the nozzles 1590 simultaneously at a frequency of about 10 Hz. In one aspect of this embodiment, the pulsed flow is provided in accordance with a square-wave function having a pulse width of about 0.05 seconds and an inter-pulse interval of about 0.05 seconds. In other embodiments, the manner in which the flow is pulsed may be different, as is described in greater detail later. As is clear from FIG. 16B, it is expected that pulsing the airflow through the nozzles disturbs the vortices emanating from the wing tips 1520. As described above, it is expected that such a disturbance can reduce the potentially harmful effect of the vortices on following aircraft.

FIGS. 17A and 17B illustrate simulated cross-flow velocity contours at the same flow field conditions described above with reference to FIGS. 16A and 16B, respectively. In particular, FIG. 17A illustrates a vortex core 1595a and cross-flow contours 1593a taken at several station locations aft of the wing tip 1520 while the vortex dissipation device 1530 is inactive. The vortex core 1595a and strong cross-flow gradients persist for a significant distance downstream of the wing tip 1520.

FIG. 17B illustrates a vortex core 1595b and corresponding cross-flow contours 1593b for a condition at which flow is pulsed through the nozzles 1590 at 10 Hz, as described above with reference to FIG. 16B. In this case, the vortical flow is significantly disturbed, and breaks up relatively quickly (e.g., a short distance aft of the wing tip 1520). These predicted results further illustrate the expectation that pulsing the flow through the nozzles 1590 can significantly disturb and/or dissipate the wing tip vortices.

Figure 18A:
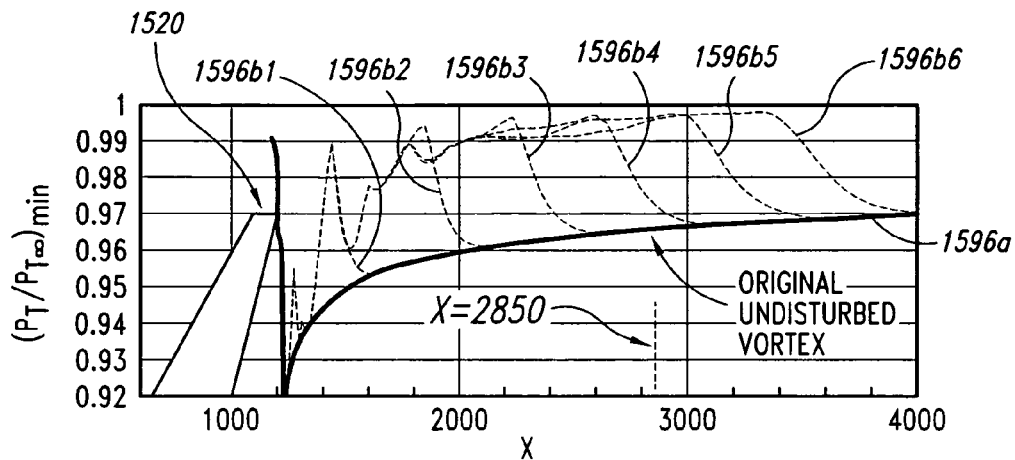
FIGS. 18A and 18B illustrate total pressure levels associated with the flow field shown in FIGS. 16A and 16B respectively.
Figure 18B:
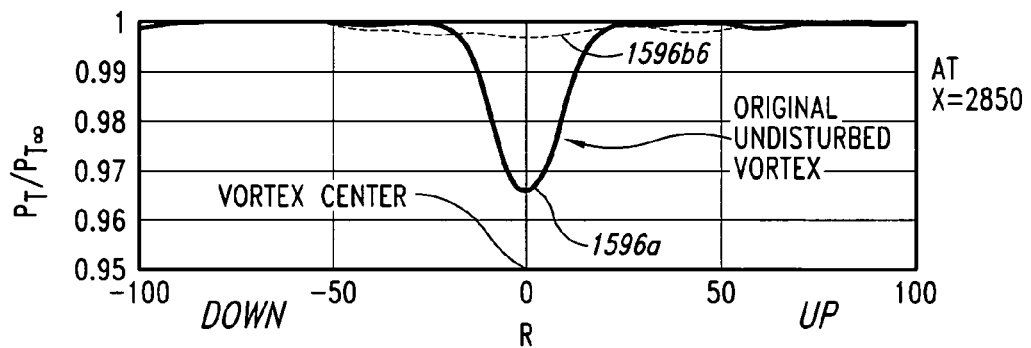

FIGS. 18A and 18B illustrate simulated total pressure levels at the same flow field conditions described above with reference to FIGS. 16A and 16B, at station locations aft of the wing tip 1520. FIG. 18A illustrates simulated total pressure levels for an undisturbed vortex, represented by line 1596*a*. FIG. 18A also illustrates total pressure levels for a disturbed vortex at successive 0.1-second time intervals after the activation of fluid pulses through the nozzles at a frequency of about 10 Hz (as represented by lines 1596*b*1-1596*b*6). Accordingly, FIG. 18A indicates that expected total pressure levels approach freestream total pressure conditions (e.g., a total pressure ratio of about 1.0) much more rapidly than does the original undisturbed vortex indicated by line 1596*a*.

FIG. 18B illustrates simulated total pressure levels at a particular vertical station behind the wing tip 1520. Solid line 1596*a* represents the total pressure level of the undisturbed vortex. Dashed line 1596*b*6 represents the total pressure level 0.6 seconds after the activation of fluid pulses through the nozzles at a frequency of about 10 Hz. Accordingly, FIG. 18B further illustrates the rapidity (0.6 seconds) with which the vortex dissipates and total pressure levels approach those associated with freestream conditions.

Figure 19:
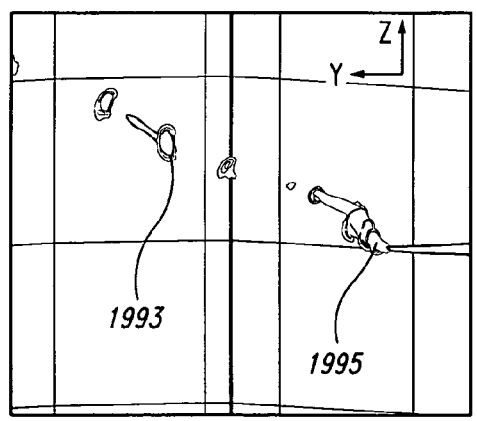
FIG. 19 illustrates expected cross-flow velocity contours associated with a flow field after activation of a system in accordance with another embodiment of the invention.

In other embodiments, the flow through the nozzles can be varied in manners other than the 10 Hz pulses described above, while still achieving significant vortex dissipation. For example, FIG. 19 illustrates expected results when flow through the nozzles is pulsed at 1 Hz (rather than 10 Hz), with a pulse width and inter-pulse interval of 0.5 seconds. FIG. 19 illustrates a vortex core 1995 and cross-flow contours 1993. A comparison of the vortex core 1995 shown in FIG. 19 with the vortex core 1595*b* shown in FIG. 17A indicates the significant ability of even relatively low frequency pulses to dissipate the vortex flow emanating from the wing tip 1520. A comparison of the cross-flow contours 1993 shown in FIG. 19 with the cross-flow contours 1593 shown in FIG. 17A further substantiates this expected result.

It is expected that, in at least some embodiments, high-frequency and low-frequency pulses may affect the wing tip vortices in different manners. For example, it is expected that high-frequency pulses may tend to perturb, break up and/or otherwise disrupt the wing tip vortices at or very near the wing tip 1520. Conversely, it is expected that lower frequency pulses may introduce perturbations into the flow at the wing tip, and that these perturbations may develop over a longer period of time, but still ultimately result in the disruption and/or break-up of the vortices. In a particular example, a comparison of FIG. 17B with FIG. 19 indicates that the vortices may break up more closely to the wing tip 1520 and in a steady fashion when subjected to relatively high frequency pulses (FIG. 17B). The vortices that may break up over a longer period of time (and therefore distance) in an unsteady fashion when subjected to lower frequency pulses (FIG. 19). In either arrangement, it is expected that the pulses dissipate, perturb, break up, and/or otherwise reduce the effect of the wing tip vortices.

The location of the particular nozzle orifices through which airflow is provided at any point in time may be varied, in addition to varying the amount of flow through any given nozzle. For example, in the simulation described above with reference to FIG. 19, flow was provided to the first and second rows 1594*a*, 1594*b* (FIG. 15B) in an alternating manner. Accordingly, the nozzles 1590 in the first row 1594*a* were pulsed at 1 Hz, with a 0.5 second pulse width and a 0.5 second inter-pulse interval, and the nozzles 1590 in the second row 1594*b* were also pulsed at 1 Hz with a 0.5 second pulse width and inter-pulse interval in a manner that was staggered by 0.5 seconds with respect to the pulses provided by the first row 1594*a*. In other words, when flow pulses were provided to the nozzles 1590 in the first row 1594*a*, the nozzles 1590 in the second row 1594*b* were inactive, and vice versa. It is believed that, in at least some instances, providing flow alternately to the first and second rows 1594*a*, 1594*b* can more effectively perturb the wing tip vortices.

Figure 20A:
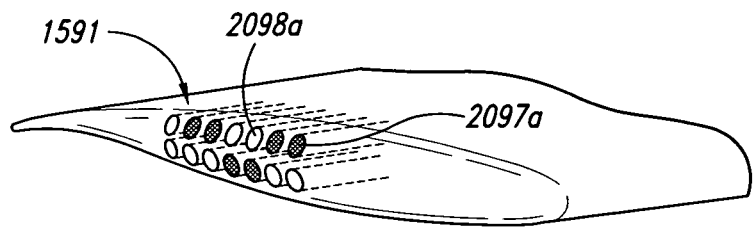
FIGS. 20A-20D illustrate active and inactive nozzles configured in accordance with several embodiments of the invention.
Figure 20B:
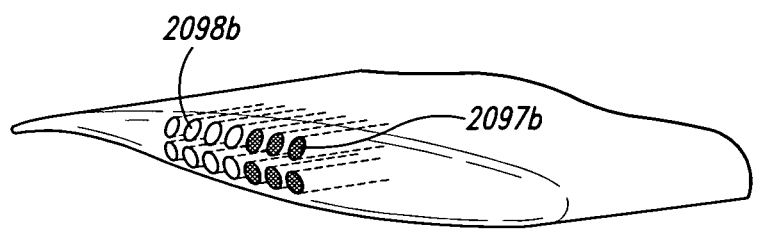

FIGS. 20A-20D illustrate representative arrangements in accordance with other embodiments in which different nozzles provide airflow at different times. FIG. 20A illustrates the nozzles 1591 with a "checkerboard" pattern of open nozzles 2098*a* and closed nozzles 2097*a*. FIG. 20B illustrates another arrangement in which closed nozzles 2097*b* are located forward of open nozzles 2098*b*. In one aspect of either embodiment, the configuration of open and closed nozzles 2098*b*, 2097*b* can be alternated to disrupt the wing tip vortices. In other embodiments, it may be determined that having some nozzles (e.g., the aft nozzles) open may be particularly beneficial at some flight conditions, and having other nozzles (e.g., the forward nozzles) open may be particularly beneficial at other flight conditions. Accordingly, the selection of open and closed nozzles may be made in a manner that depends upon the flight regime of the aircraft. In other embodiments, the nozzles may alternate between open and closed states in different manners. In any of these embodiments, flow may be pulsed through the nozzles 1591 in a time-varying manner that is superimposed upon the time-varying manner with which nozzles switch from being active to being inactive. Accordingly, the frequency with which flow is pulsed through the active or open nozzles may be the same as, greater than, or less than the frequency with which the nozzles alternate between active and inactive states.

Figure 20C:
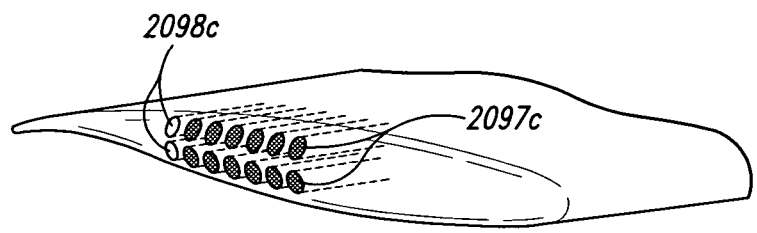
Figure 20D:
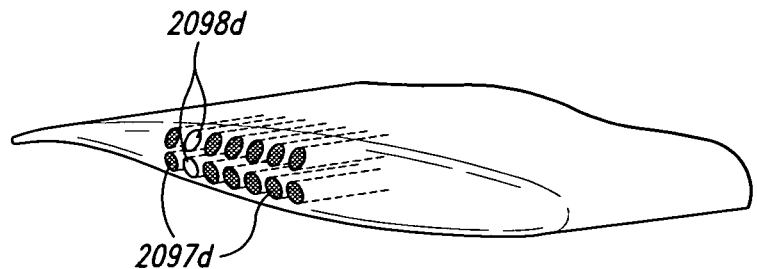

FIGS. 20C and 20D illustrate a manner of varying the flow through the nozzles so as to create a traveling "wave" of nozzle flow at the wing tip 1520. For example, FIG. 20C illustrates two active nozzles 2098*c* positioned aft, with the remaining inactive nozzles 2097*c* positioned forward, at time $T_0$. At time $T_1$ (illustrated in FIG. 20D) the active nozzles 2098*d* have shifted one column forward from the arrangement shown in FIG. 20C, and the inactive nozzles 2097*d* are now positioned both forward and aft of the active nozzles 2098*d*. The location of the active nozzles 2098*d* can continue to shift sequentially forward in a similar manner until the forward-most nozzles are open. At this point, the "wave" of active nozzles can restart with the aft-most row of nozzles, or the wave can reverse and travel in the aft direction.

It will be appreciated that the number of nozzles, the location of the nozzles, the timing of pulses through the nozzles, and/or a variety of other factors can be selected and/or changed in different arrangements. The factors that drive the selection of these parameters can include (but are not limited to) the type of aircraft on which the nozzles are installed (e.g., fixed wing, or rotorcraft), the particular flight condition at which the aircraft is flying, the shape and configuration of the airfoil in which the system is installed, and/or the desired degree to which the decay rate of the tip vortices is to be accelerated.

Figure 21A:
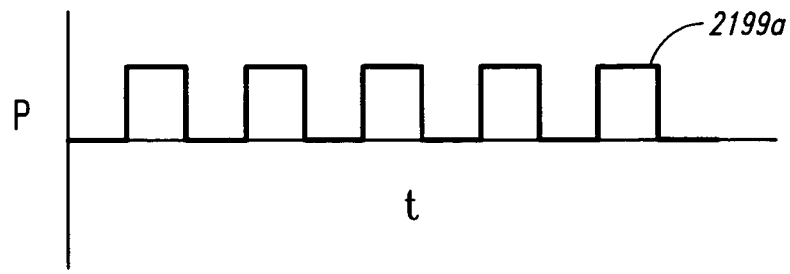
FIGS. 21A-21D schematically illustrate manners for pulsing fluid flow through nozzles in accordance with several embodiments of the invention.

FIGS. 21A-21D illustrate representative pulse profiles in accordance with which the flow through any given nozzle may be varied. For example, FIG. 21A illustrates a pulse profile 2199*a* having a step function. The width of each step (e.g., the time during which flow is passing through the nozzle) and the complementary inter-pulse interval (e.g., the time during which flow is not flowing through any given nozzle) can be varied in a manner selected to produce particular results. For example, in an embodiment shown in FIG.

21A, the pulse width and inter-pulse interval are the same, while in other embodiments, the pulse width and inter-pulse interval can be different.

Figure 21B:
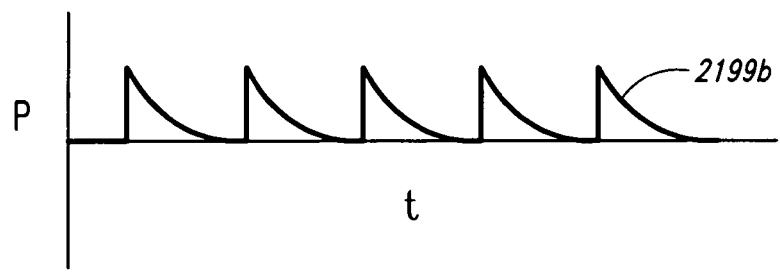
Figure 21C:
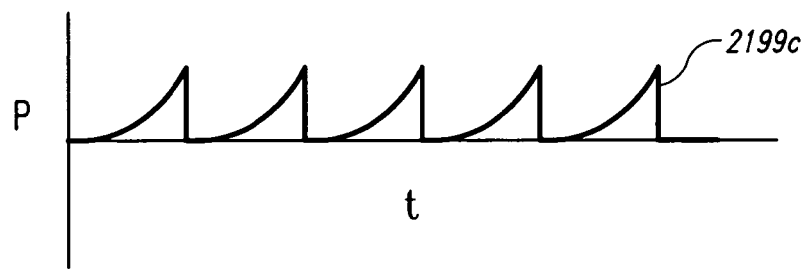
Figure 21D:
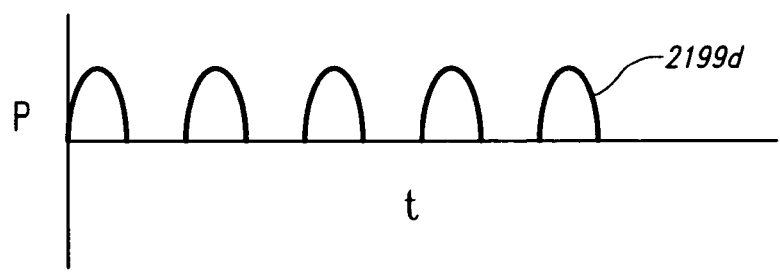

FIG. 21B illustrates a pulse profile 2199b having a step increase in flow and a subsequent gradual decrease in flow, followed by an immediate step increase once the flow rate decreases to zero. FIG. 21C illustrates a pulse profile 2199c in which the increase in flow rate is gradual and the decrease is a step function. As is also shown in FIG. 21C, the pulse profile 2199c can include an inter-pulse interval in which no flow is ejected through the corresponding nozzle. FIG. 21D illustrates a pulse profile 2199d having a sinusoidally varying pulse flow rate.

The arrangements shown in FIGS. 15A-21D and the associated discussion provide representative examples of arrangements that may be used to disrupt the vortical flow forming at the tips of airfoil devices. The location and/or manner with which flow is ejected from these tip regions may be selected and/or varied in other manners in accordance with further embodiments of the invention.

Figure 22:
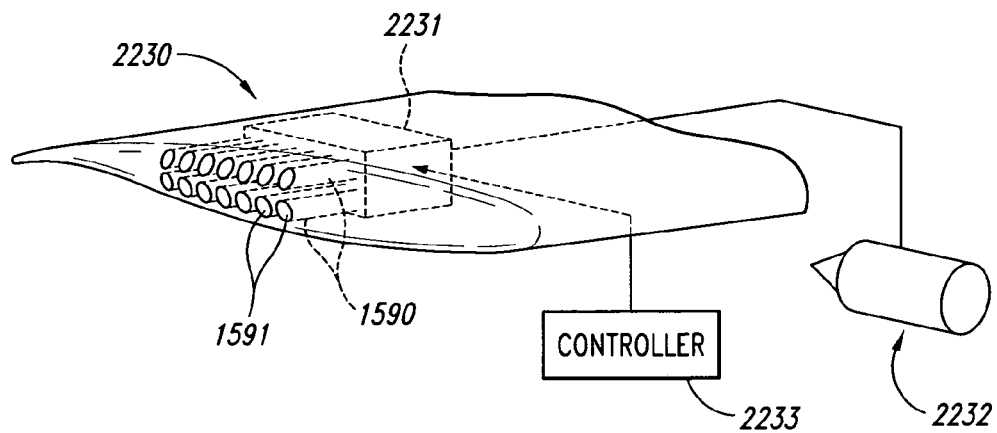
FIG. 22 is a partially schematic illustration of an aircraft system that includes a vortex dissipation device configured in accordance with another embodiment of the invention.

FIG. 22 illustrates an arrangement of a vortex dissipation device 2230 configured in accordance with an embodiment of the invention. The vortex dissipation device 2230 can include the nozzles 1590 and orifices 1591 arranged in a manner generally similar to that described above with reference to FIG. 15A. In other embodiments, the arrangement and/or configuration of the nozzles can be different. In any of these embodiments, the vortex dissipation device 2230 can include a valve device 2231 that selectively directs flow or inhibits flow through any of the nozzles 1590. In a particular aspect of this embodiment, the valve device 2231 can be a fluidic device that uses changes in pressure to open and close the corresponding orifices. The changes in pressure can be provided by a corresponding fluidic or pneumatic control valve arrangement and need not include moving parts at the nozzle itself to open or close the nozzles. Suitable devices are available from Honeywell, Inc. of Morris Township, N.J. In other embodiments, other suitable fluidic, mechanical, and/or electromechanical valves can be incorporated into the valve device 2231.

In any of the foregoing embodiments, the relatively high pressure air ejected through the nozzles 1590 can be provided by a high pressure air source 2232. The high pressure air source 2232 can include a compressor stage of one of the aircraft engines (e.g., a primary engine or auxiliary power unit). In other embodiments, the air provided to the nozzles 1590 can be pressurized by a separate source, for example, an electrically driven compressor.

In any of the foregoing embodiments, the vortex dissipation device 2230 can further include a controller 2233 that is operatively coupled to the valve device 2231, and that can be configured to direct signals to the valve device 2231 that instruct the valve device 2231 when and how to regulate the flow to each nozzle 1590. In particular embodiments, the controller 2233 can include a computer system. Accordingly, many of the directions provided by the controller 2233 may take the form of computer-executable instructions, including routines executed by a programmable computer. The term "computer" as generally used herein, refers to any data processor and can include multi-processor systems, processor-based or programmable consumer electronics, network computers, mini-computers, hand-held devices and the like. Program modules or subroutines may be located in local and remote memory storage devices, and may be stored or distributed on computer-readable media, including magnetic or optically-readable or removable computer disks, as well as distributed electronically over networks. Accordingly, the controller 2233 can be programmed to vary the manner with which flow is provided through the nozzles 1590 in a particular, pre-set manner that may in some cases be adjusted by the operator. The controller 2233 can be coupled to other aircraft systems so as to automatically change the characteristics of the flow provided through the nozzles in a manner that depends upon the particular flight regime in which the corresponding aircraft is flying. For example, the characteristics of the flow can be automatically changed depending on whether the aircraft is at a high-speed cruise condition, or a low-speed approach or take-off condition. When the nozzles 1590 are configured to move, the controller 2233 can also be configured to direct the movement of the nozzles 1590.

Figure 23:
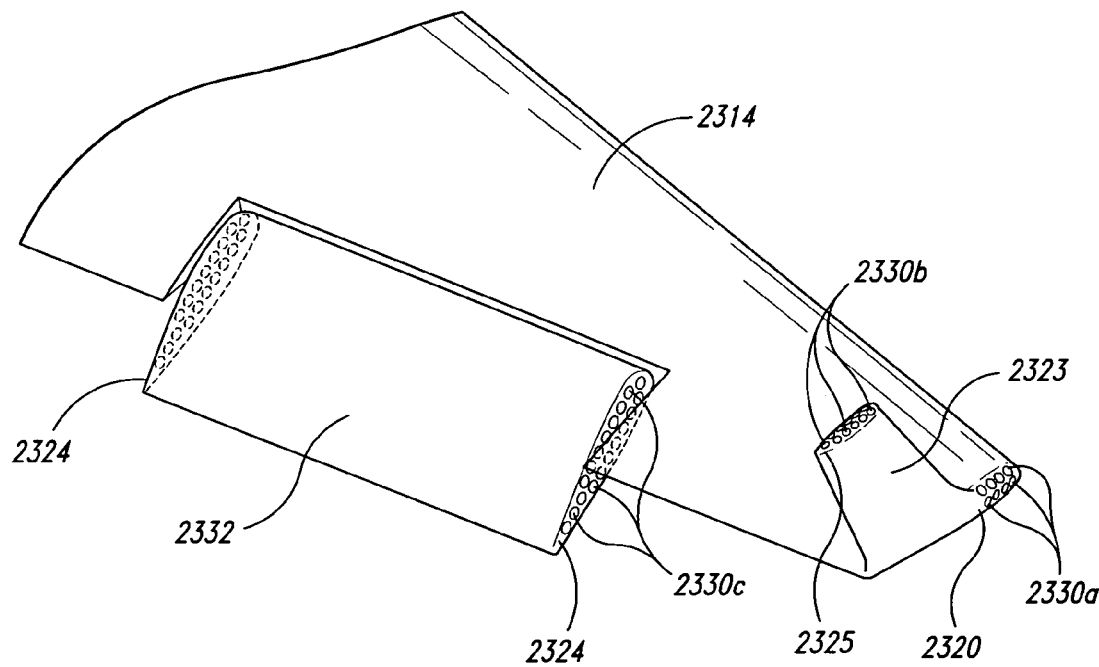
FIG. 23 is a partially schematic illustration of an aircraft system that includes vortex dissipation devices configured in accordance with still further embodiments of the invention.

FIG. 23 is a partially schematic illustration of a wing 2314, illustrating several different vortex dissipation devices 2330a-c (referred to collectively as vortex dissipation devices 2330) in accordance with several additional embodiments of the invention. For purposes of illustration, these devices are shown on a single wing 2314. Wings in accordance with still further embodiments can include various combinations of the illustrated vortex dissipation devices 2330, or any of the illustrated devices 2330 singly. Any of these devices 2330 can have fixed geometry orifices that deliver time-varying jet pulses, or spatially mobile orifices that deliver steady jet flows, or orifices that are both spatially mobile and that deliver time-varying jet pulses.

The wing 2314 can include a wing tip 2320 having a wing tip vortex dissipation device 2330a. The wing tip vortex dissipation device 2330a can have a configuration generally similar to any of those described above. The wing 2314 can also include a winglet 2323, which can include a winglet tip 2325 with (optionally) a winglet tip vortex dissipation device 2330b. In some embodiments, the size of the winglet 2323 can determine whether or not the winglet 2323 is outfitted with a winglet tip vortex dissipation device 2330b. In general, the larger the winglet 2323, the greater the potential benefit from the winglet tip vortex dissipation device 2330b.

The wing 2314 can also include a trailing edge device 2332 (e.g., a flap) having trailing edge device tips 2324. The trailing edge device tips 2324 can be outfitted with trailing edge device tip vortex dissipation devices 2330c. Again, it is expected that the larger the trailing edge device 2332, the greater the expected benefit from the trailing edge device tip vortex dissipation devices 2330c.

From the foregoing, it will be appreciated that specific embodiments of the invention have been described herein for purposes of illustration, but that various modifications may be made without deviating from the invention. For example, aspects of the invention described in the context of particular embodiments may be combined or eliminated in other embodiments. In a particular example, the time-varying characteristics of the nozzle flow described above may be combined with the spatially varying characteristics of the nozzles, which were also described above. In a particular embodiment, nozzles having spatially fixed locations, but that deliver pulsed jet flows, can be provided in a wing tip, and nozzles having the opposite characteristics (spatially mobile, but a steady jet flow) can be provided in the tip of a flap or other high-lift device. In other embodiments, the locations of the fixed and movable nozzles can be reversed. The flow that is pulsed through the nozzles can be pulsed at frequencies less than 1 Hz, greater than 10 Hz or frequencies between 1 and 10 Hz in various embodiments.

Any of the nozzles described above can have features that differ from those shown in the Figures and described in the associated text. For example, while the nozzles shown in the Figures have a generally circular cross-sectional exit shape, in other embodiments, the nozzle exits (and/or other regions of the nozzle) can have non-circular cross-sectional shapes. Multiple nozzles can be combined (e.g., in the form of a slot) to reduce the overall number of individual nozzles, and in other embodiments, the number of individual nozzles can be increased from the numbers shown in the Figures. The nozzles can have shapes and configurations different than those shown in the Figures and described above, and can be installed on aircraft having configurations different than those shown in the Figures and described above. In many cases, the nozzles are configured to direct air from the tips of the airfoils, and in some cases, the nozzles can direct other gases or other fluids. While advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An aircraft system, comprising:
   an airfoil having first and second oppositely facing flow surfaces and a tip; and
   a vortex dissipation device carried by the airfoil, the vortex dissipation device including:
     a fluid flow nozzle coupleable to a source of pressurized fluid, the fluid flow nozzle having an orifice positioned to direct a flow of fluid outwardly from the tip with a spanwise direction component;
     a valve device coupled in fluid communication with the fluid flow nozzle to selectively control the flow passing through the orifice; and
     a controller operatively coupled to the valve device, wherein the controller is programmable to vary the operation of the valve device and cause pulsed operation of the valve device during flight.

2. The system of claim 1 wherein the orifice is positioned in the tip surface.

3. The system of claim 1 wherein the controller directs the valve device to deliver pulses of flow through the orifice at a frequency of from about 1 Hz. to about 10 Hz.

4. The system of claim 1 wherein the fluid flow nozzle is movable relative to the airfoil between a first position with the orifice directed upwardly and a second position with the orifice directed downwardly.

5. The system of claim 4 further comprising an actuator coupled to the nozzle, and wherein the controller is operatively coupled to the actuator to direct the movement of the nozzle.

6. The system of claim 1 wherein the orifice includes a first orifice and wherein the wing includes a deployable high-lift device having a tip, and wherein the vortex dissipation device includes a second fluid flow nozzle having an orifice positioned at the tip of the high-lift device to direct a flow of fluid outwardly from the tip of the high-lift device, the second fluid flow nozzle being coupleable to the source of pressurized fluid.

7. The system of claim 6 wherein one of the first and second fluid flow nozzles is movable relative to the airfoil during flight, and wherein the other of the first and second fluid flow nozzles is fixed relative to the airfoil during flight.

8. The system of claim 1 wherein the fluid flow nozzle is one of a plurality of fluid flow nozzles, each having an orifice positioned to direct a flow of fluid outwardly from the tip, and each being coupleable to the source of pressurized fluid, and wherein the valve device is coupled in fluid communication with the plurality of fluid flow nozzles.

9. The system of claim 8 wherein the controller includes a computer-readable medium.

10. The system of claim 9 wherein the nozzles are arranged in at least two rows including a first row positioned toward the first flow surface of the airfoil and a second row positioned toward the second flow surface of the airfoil.

11. The system of claim 10 wherein the controller directs the valve device to selectively activate orifices of nozzles in the first row while deactivating orifices of nozzles in the second row, and to selectively activate orifices of nozzles in the second row while deactivating orifices of nozzles in the first row.

12. The system of claim 8 wherein the controller directs the valve device to selectively activate different orifices at different times.

13. The system of claim 1 wherein the controller includes instructions for directing the valve device to change the state of the fluid flow nozzle in different manners depending on a flight regime in which the airfoil is operating.

14. The system of claim 1 wherein the controller includes instructions for directing the valve device to provide a step pulse to the orifice.

15. The system of claim 1 wherein the controller includes instructions for directing the valve device to provide a ramped pulse to the orifice.

16. The system of claim 1 wherein the airfoil includes a wing having a wing root opposite the tip.

17. An aircraft system, comprising:
    a wing having first and second oppositely facing flow surfaces, a wing root, and a wing tip; and
    a vortex dissipation device carried by the wing, the vortex dissipation device including:
      a plurality of fluid flow nozzles coupleable to a source of pressurized fluid, each fluid flow nozzle having an orifice positioned at the wing tip to direct a flow of fluid outwardly from the wing tip;
      a valve device coupled in fluid communication with the fluid flow nozzles to selectively control the flow passing through the orifices; and
      a controller operatively coupled to the valve device to direct the operation of the valve device, the controller including a computer-readable medium programmed with instructions for directing the valve device to selectively activate and deactivate different orifices at different times.

18. The system of claim 17 wherein the fluid flow nozzles are movable relative to the wing between corresponding first positions with the orifices directed upwardly and corresponding second positions with the orifices directed downwardly, and wherein the system further comprises an actuator coupled to the nozzles, and wherein the controller is operatively coupled to the actuator to direct the movement of the nozzles.

* * * * *